(12) United States Patent (10) Patent No.: US 9,384,299 B2
Gutta et al. (45) Date of Patent: Jul. 5, 2016

(54) RECEIVING CONTENT FOR MOBILE MEDIA SHARING

(75) Inventors: Vijay Bhaskar Reddy Gutta, East Brunswick, NJ (US); Eric Hoffert, South Orange, NJ (US); Richard Leigh Newsome, New York, NY (US); Duncan Kennedy, Toronto (CA); Brenda Pomerance, New York, NY (US)

(73) Assignee: Thwapr, Inc., New York, NY (US)

( * ) Notice: Subject to any disclaimer, the term of this patent is extended or adjusted under 35 U.S.C. 154(b) by 873 days.

(21) Appl. No.: 12/887,412

(22) Filed: Sep. 21, 2010

(65) Prior Publication Data

US 2011/0072107 A1 Mar. 24, 2011

Related U.S. Application Data

(60) Provisional application No. 61/277,195, filed on Sep. 22, 2009.

(51) Int. Cl.
*G06F 15/16* (2006.01)
*G06F 17/30* (2006.01)

(52) U.S. Cl.
CPC ................................ *G06F 17/30905* (2013.01)

(58) Field of Classification Search
CPC .................. H04L 12/189; G06F 17/30905

USPC .................................. 709/217, 227, 231, 246
See application file for complete search history.

(56) References Cited

U.S. PATENT DOCUMENTS

| | | | |
|---|---|---|---|
| 8,291,102 B2 * | 10/2012 | Guo et al. ..................... 709/231 |
| 2002/0026500 A1 * | 2/2002 | Kanefsky et al. ............. 709/219 |
| 2004/0267965 A1 * | 12/2004 | Vasudevan et al. ........... 709/250 |
| 2006/0129638 A1 * | 6/2006 | Deakin ......................... 709/203 |
| 2007/0226365 A1 * | 9/2007 | Hildreth et al. ............... 709/231 |
| 2008/0108299 A1 * | 5/2008 | Hullot et al. ................. 455/3.01 |
| 2008/0147592 A1 * | 6/2008 | Nandiwada et al. ............. 707/1 |
| 2009/0103692 A1 * | 4/2009 | Burg et al. ................. 379/88.18 |
| 2010/0299701 A1 * | 11/2010 | Liu et al. ......................... 725/39 |
| 2011/0289187 A1 * | 11/2011 | Brodin et al. ................. 709/217 |

FOREIGN PATENT DOCUMENTS

WO WO 2007123783 A2 * 11/2007

* cited by examiner

*Primary Examiner* — Brian J Gillis
*Assistant Examiner* — Austin Moreau
(74) *Attorney, Agent, or Firm* — Brenda Pomerance

(57) ABSTRACT

A media sharing system is able to deliver media content, including video, audio, photographs and graphics, to a wide variety of devices, using a file format appropriate to the delivery device and using a delivery method appropriate to the delivery device.

16 Claims, 26 Drawing Sheets

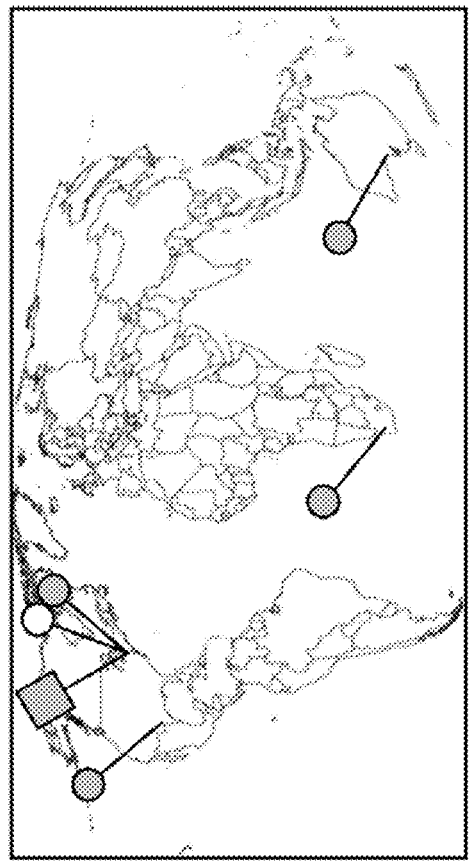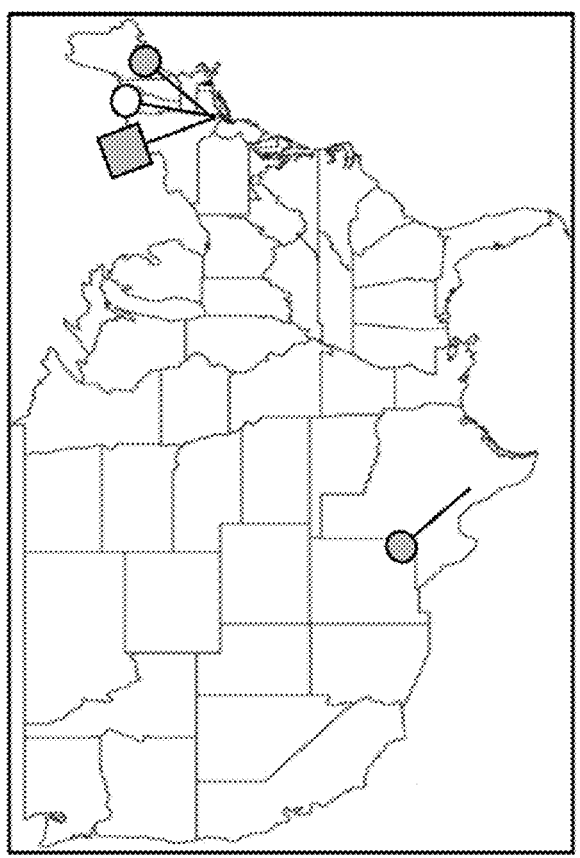
Fig. 6A
Fig. 6B

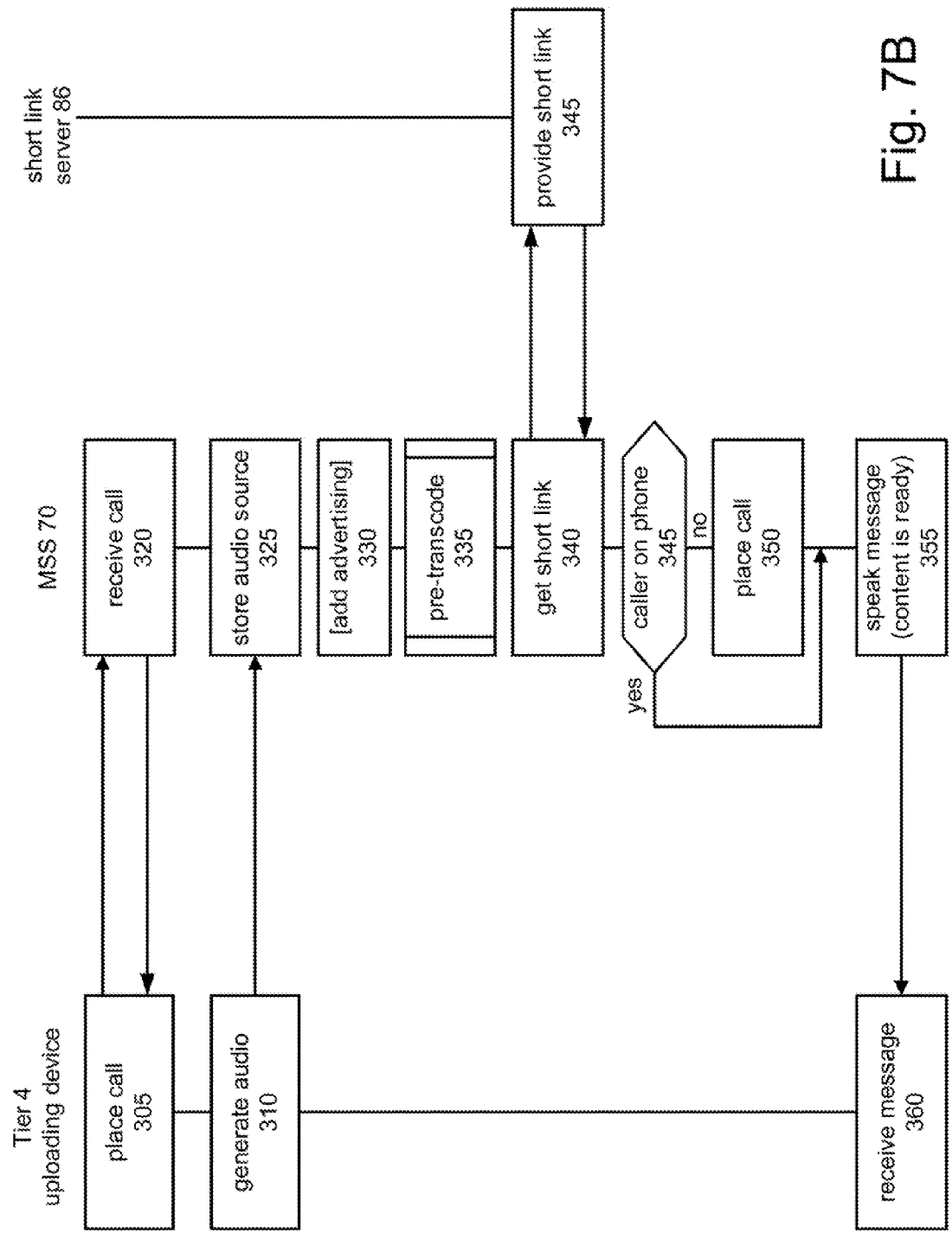

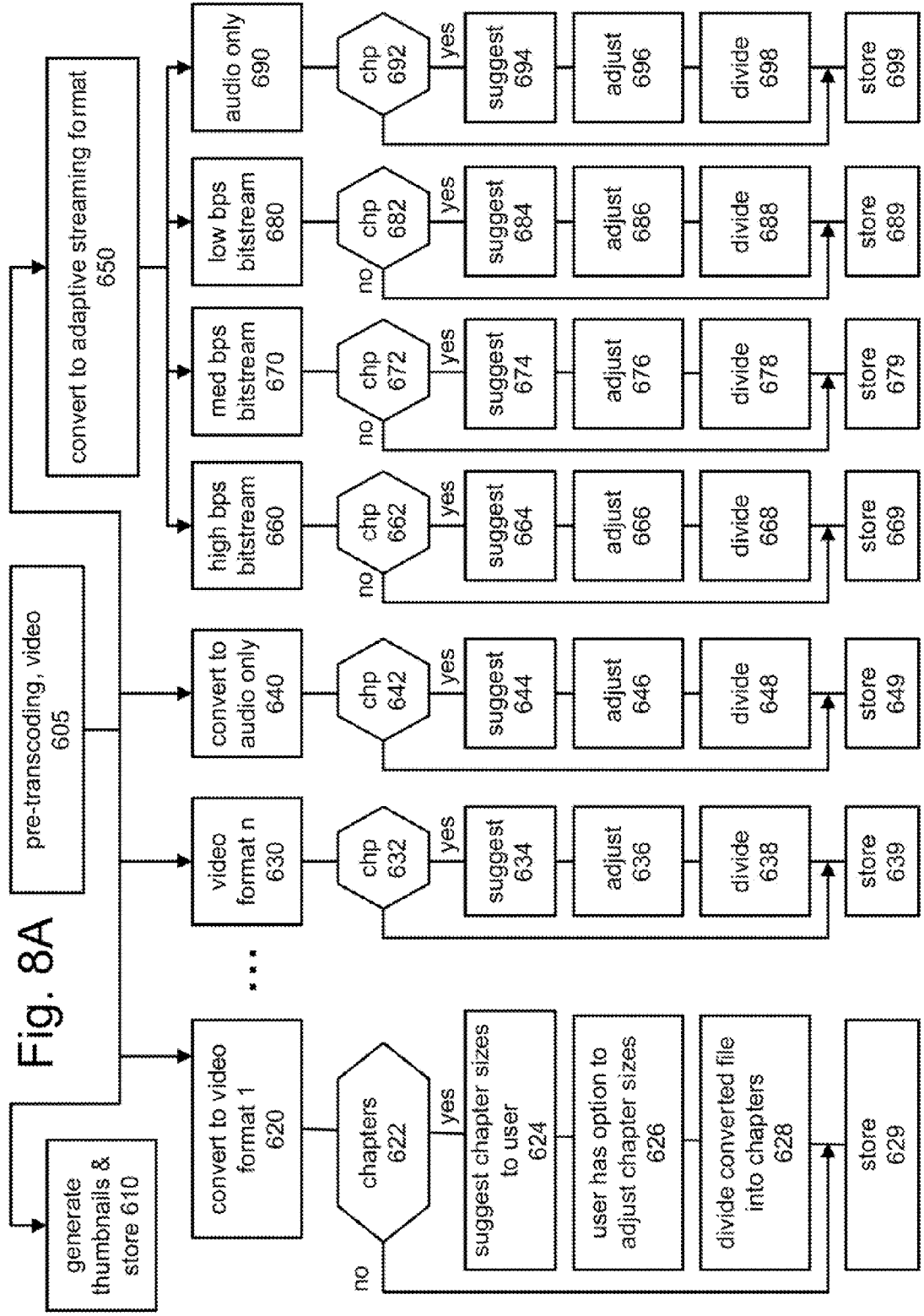

Fig. 14

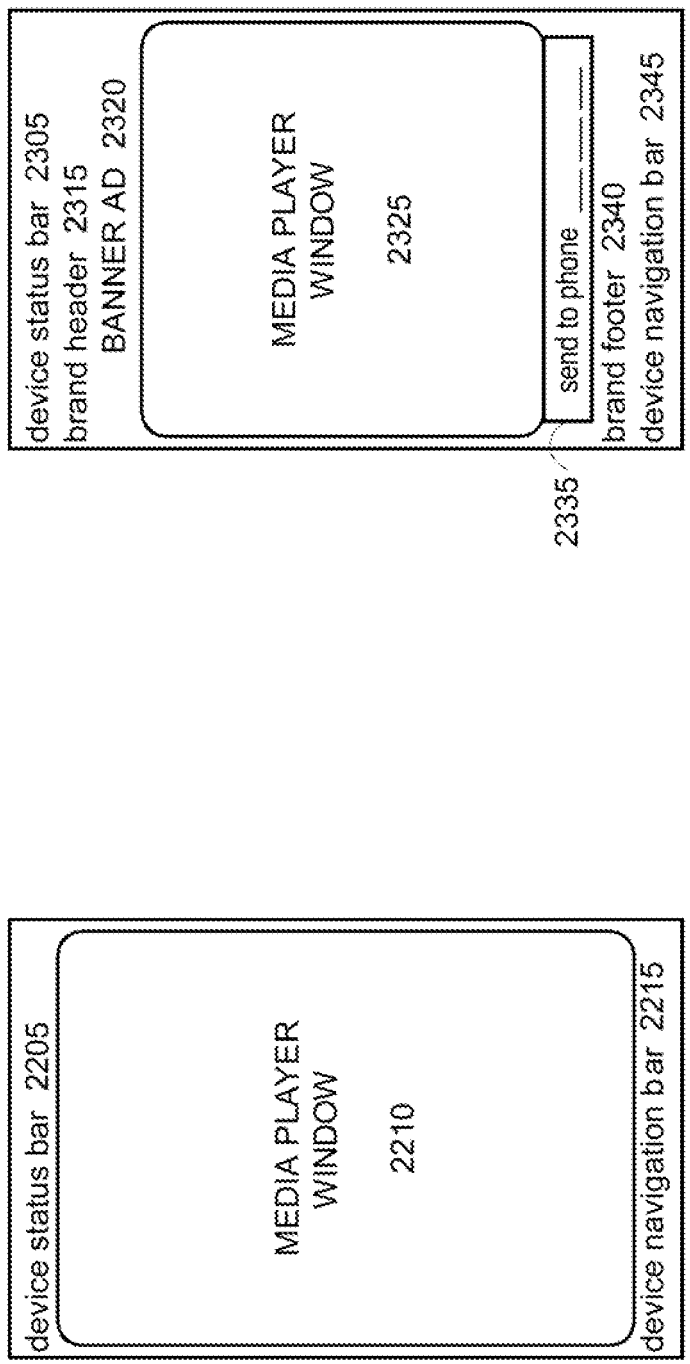

RECEIVING CONTENT FOR MOBILE MEDIA SHARING

CROSS-REFERENCE TO RELATED APPLICATIONS

This application claims priority from U.S. provisional patent application Ser. No. 61/277,195, filed Sep. 22, 2009, and having common inventors herewith.

The disclosure of U.S. provisional patent application Ser. No. 61/277,195 is hereby incorporated by reference herein in its entirety.

BACKGROUND OF THE INVENTION

The present invention relates to sharing content media for mobile devices, and more particularly, is directed to an infrastructure for enabling receiving of content based on the capabilities of each device.

Mobile communications has exploded in popularity, and is expected to continue to grow. Manufacturers continue to innovate in the types and capabilities of mobile devices. Content providers wish to make their content available to the growing community of mobile device users. However, due to the staggering quantity and variety of device physical and functional capabilities, it is extremely difficult to easily provide content to the community. At present, there are over 6,000 different devices used by the community. Additionally, desktop computer users should also be included in the community.

Accordingly, there is a need for an intermediate system that attends to the details of how to present content depending on the capabilities of a receiving device, particularly when the receiving device is a mobile device.

SUMMARY OF THE INVENTION

In accordance with the present invention, there is provided a method of responding to a request for information, comprising receiving, at a computer from a device, a content identifier and a user agent identifier, and obtaining, by the computer, device characteristics based on the user agent identifier. The computer selects a content provision technique based on the device characteristics, retrieves content associated with the content identifier, and provides the retrieved content according to the selected content provision technique.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 6A and 6B are diagrams of screen displays showing content with geographic information;

FIGS. 7A and 7B are flowcharts showing content uploading for different device types;

FIGS. 8A and 8B are flowcharts showing pre-transcoding for different media types;

FIG. 14 is a diagram of a screen display showing which of a user's contacts are online;

FIGS. 24A and 24B are diagrams showing different screen displays on a mobile device.

DETAILED DESCRIPTION

As used herein, "keyword" has one of two meanings, depending on context. A "descriptive keyword" describes the nature of content, and typically appears in metadata for a content file. A "mobile keyword" is part of an SMS message, typically to identify to which channel a user wants to subscribe.

Figure 1A:
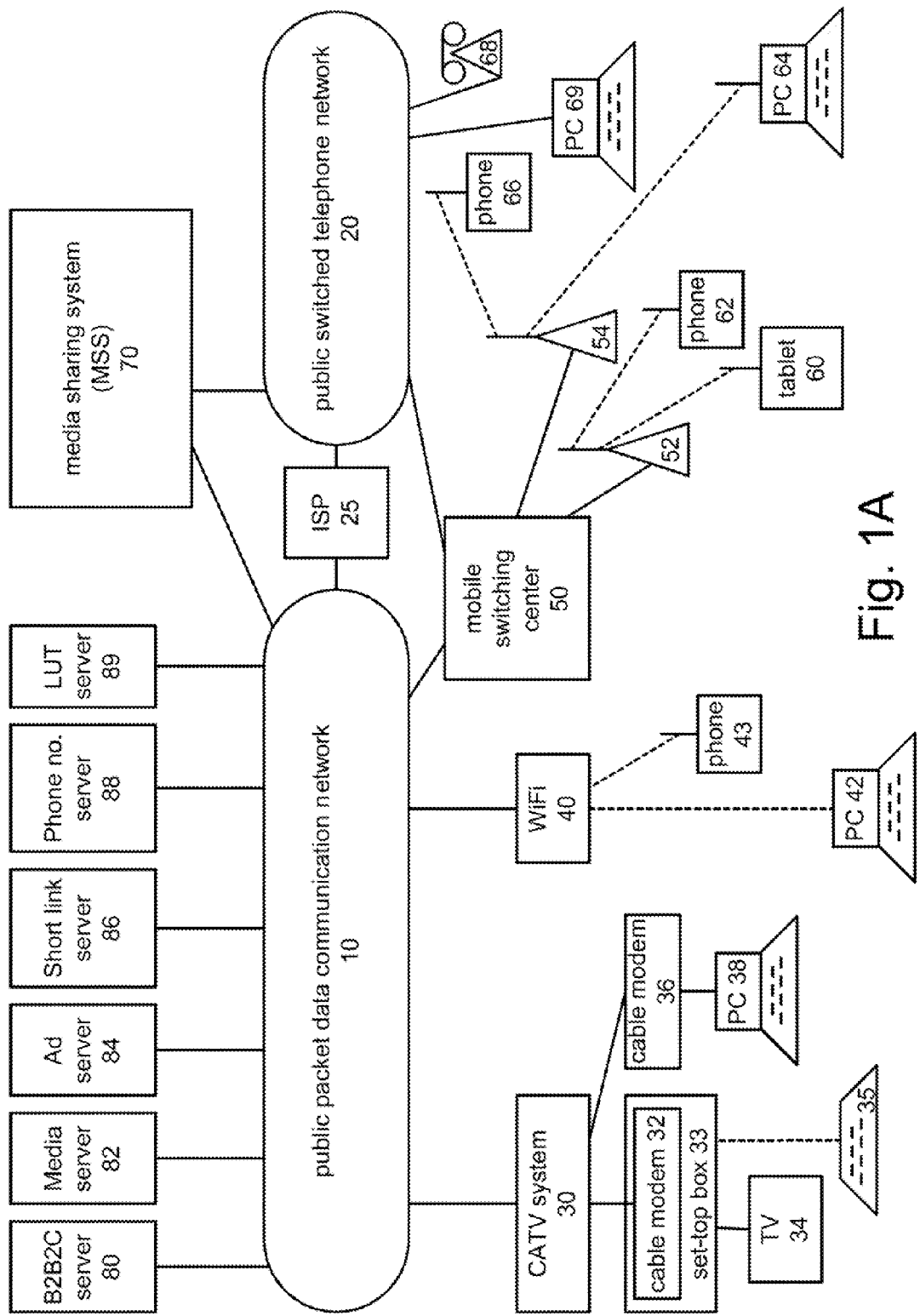
FIG. 1A is a block diagram showing a configuration in which the present invention is employed.

FIG. 1A is a block diagram showing a configuration in which the present invention is employed. FIG. 1A shows public packet data communication network 10, such as the Internet, and to circuit-switched public switched telephone network (PSTN) 20. Internet services provider (ISP) 25 is coupled to both data network 10 and telephone network 20.

Community antenna television (CATV) system 30 is coupled to data network 10. CATV system 30 includes a head-end with suitable general purpose computers, and a cable plant between the head-end and subscriber locations (homes or offices) having both downstream and upstream capability.

In one subscriber location, there is set-top box 33 including cable modem 32 and a general purpose computer sufficient to provide access to data network 10, such as AppleTV, GoogleTV, or other browser software or application software. Set-top box 33 communicates with television 34 and with keyboard 35. In some cases, keyboard 35 is a game console or mobile phone, and communication between set-top box 33 and keyboard 35 is via an infra-red channel or other wireless or wireline channel.

At another subscriber location, there is cable modem 36 coupled personal computer (PC) 38. PC 38 has a general purpose processor, display, keyboard, mouse (not shown), storage and possibly a printer. PC 38 has an operating system and an Internet browser, both conventional, and available from a variety of vendors.

Wireless controller (WiFi) 40 is coupled to data network 10 and to PC 42 and phone 43. WiFi 40 provides wireless communication channels to PC 42 and to phone 43. PC 42 and phone 43 each have a general purpose processor, storage, display capability and an input interface, and execute software including an operating system and an Internet browser.

Mobile switching center (MSC) 50 is coupled to data network 10 and telephone network 20, and antennas 52 and 54, which provide cellular communication channels to tablet computer 60, phone 62, PC 64 and phone 66. Communication protocols supported by MSC 50 include text messaging, SMS, MMS, GPRS and other protocols. The 3GPP format enables concurrent video and voice delivery to one device.

Telephone 68 is a conventional voiceband telephone coupled to telephone network 20.

PC 69 is a conventional personal computer having an operating system and browser, using a dial-up connection provided by telephone network 20 to ISP 25.

Media sharing system (MSS) 70 is a general purpose computer or system of general purpose computers with suitable processing, software, communications and storage capability to operate according to the present invention. The functions of MSS 70 are discussed in detail below. MSS 70 is coupled to data network 10 and telephone network 20. MSS 70 includes an internal database of device characteristics.

Figure 1B:
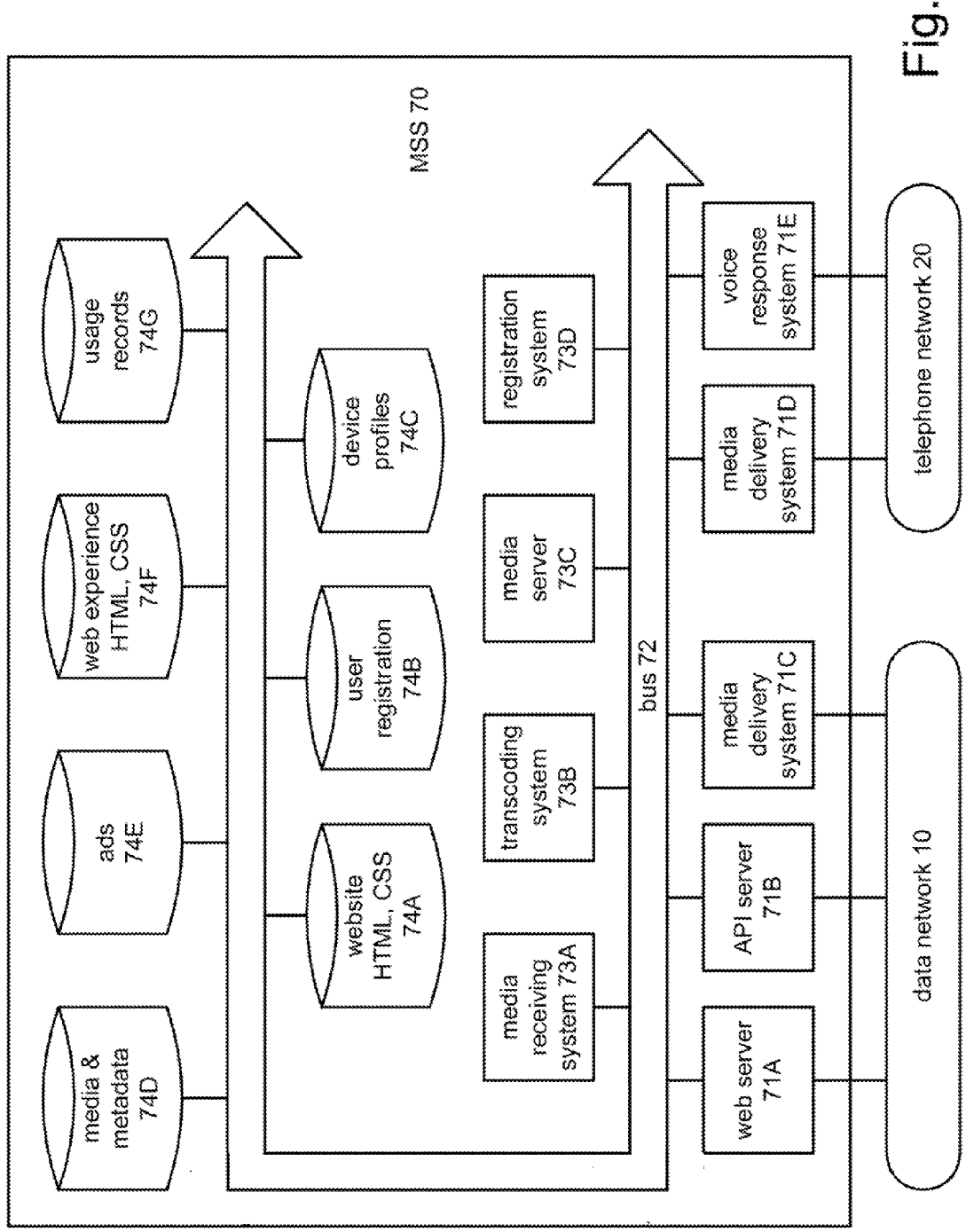
FIG. 1B is a block diagram showing components of MSS 70.

FIG. 1B shows one embodiment of MSS 70. Web server 71A, API server 71B and media delivery system 71C are each coupled to data network 10 and bus 72. Media delivery system 71D and voice response system 71E are each coupled to telephone network 20 and bus 72. Each of media receiving system 73A, transcoding system 73B, media server 73C, registration system 73D, website database 74A, user registration database 74B, device profiles database 74C, media and media metadata database 74D, ad database 74E, web experience database 74F and usage records database 74G is coupled to bus 72. Suitable firewalls, not shown, are provided. Each of the systems in FIG. 1B can be a single processor, multiple processors at one or more locations or software executing in a processor shared with another component of MSS 70. Each of the databases shown in FIG. 1B can have separate storage media or shared storage media, which may be mirrored at a second site for security and/or speed considerations. In some embodiments, MSS 70 supports commerce functions, such as activating paid subscriptions, auctioning mobile keywords, and enabling purchase of mobile keywords.

B2B2C server 80, media server 82, ad server 84, short link server 86, phone number server 88, and look-up table (LUT) server 89 are each a general purpose computer with suitable processing, software, communications and storage capability to operate according to the present invention, and are each coupled to data network 10.

B2B2C server 80 is an instance of a content syndication server that automatically sends (uploads) content to MSS 70.

Media server 82 enables uploading and viewing of media including photographs, video and/or graphics. An instance of media server 82 is www.photobucket.com. Another instance of media server 82 is www.watchmojo.com.

Short link server 86 converts a full data network address, corresponding to a uniform resource identifier when data network 10 is the Internet, into a shorter address. An instance of short link server 86 is the bit.ly service available on the Internet. Another instance of short link server 86 is www.tinyurl.com.

Phone number server 88 provides information about phone numbers. An instance of phone number server 88 is www.netnumber.com.

LUT server 89 uses a device identifier to provide characteristics regarding the device. Instances of LUT server 89 include www.deviceatlas.com, wurfl.sourceforge.net, and www.ripcode.com.

Generally, users upload content to MSS 70, then send the content to other users. Each user is associated with one or more devices that can communicate via data network 10, telephone network 20, or both.

The present invention categorizes devices into one of four tiers. However, this invention is not limited to the particular tier configuration discussed below, that is, more or less tiers may be used. A device represented by a device profile and is assigned to a tier based on its characteristics. The tier of a device determines how MSS 70 interacts with the device.

More specifically, device characteristics include: type of communication channel, physical device, and software available on the device. The interaction consequences include: notification, how MSS 70 notifies a device of media available to it; file delivery, how MSS 70 delivers the media to the device; file communication technique, the communication technique used by MSS 70 to support the chosen file delivery method; and adaptive rendering, how MSS 70 presents information tailored to the physical and functional display capabilities available on the device.

In this embodiment, device functionality decreases by tier.

Tier 1 has devices capable of the broadest range of functions.

Tier 1 communication channel characteristics include high bandwidth cellular data, 4G long term evolution (LTE), and WiMax.

Tier 1 devices include mobile phones with data plans operating on a cellular network. Some mobile phones can operate on either cellular or WiFi, these are Tier 1 devices when operating on a cellular network, and Tier 2 devices when operating on a WiFi network. Tier 1 devices may have keypad, keyboard or touch screen input interface(s).

Tier 1 software includes an Internet browser, the ability to execute JavaScript and to stream or download video files, and a graphical user interface (GUI) that may be limited due to the physical dimensions of the device.

Tier 1 notification methods include short message service (SMS), email, and "push" to a native application on the phone, such as available with iPhone applications. When notification occurs, it may use one or more notification methods. For instance, providing SMS and email notification ensures that a phone that can operate on both cellular and WiFi services is promptly notified, regardless of which service is being used. When notification occurs, it uses a technique appropriate for the receiving device. For instance, if a receiving device has downloaded a native application, corresponding to client software, such as from MSS 70, then only push notifications are sent to that device because the native application is best configured to coordinate push notices.

Tier 1 file delivery methods include streaming, downloading, and a multi-media messaging service (MMS) message with embedded content. A user who has actively registered can explicitly choose a default file delivery method for each of their devices.

Tier 1 file communication techniques include downloading, progressive downloading, regular streaming and adaptive streaming.

Tier 1 adaptive rendering adapts to the device's interaction ability and the size of the physical display.

Phone 62 is an example of a Tier 1 device.

Tier 2 communication channel characteristics include wireline data transmission via either cable, digital subscriber line (DSL), optical fiber, integrated service digital network (ISDN) or telephone modem; or WiFi. Generally, a Tier 2 communication channel is assumed to not have latency or bandwidth concerns. Typically, SMS and MMS are not available; if they are available, only selected functionality is available.

Tier 2 devices include a PC communicating via a wireline or WiFi channel; a personal digital assistant (PDA), a tablet computer, a mobile phone communicating via a WiFi channel; an Internet TV device; and a so-called next generation landline device having Internet protocol connectivity, such as a Verizon Hub or AT&T Open Tablet, both using hardware from Open Peak, and operational on DSL or fiber optic channels.

Tier 2 software includes an Internet browser, a full GUI, and the ability to execute JavaScript and to stream or download video.

Tier 2 notification methods include email and a "push" application indicated by an icon or pop-up window from native application software indicating that a message has arrived. The native software provides one or more icons as part of a GUI to advise the user of the status of incoming messages. For example, one icon may indicate total incoming notices of new media, while another icon may indicate total incoming notices of only a specific type of media, such as photographs, messages from contacts or messages from originators within a predetermined distance from the receiving device.

Tier 2 file delivery methods include streaming and downloading from a website using hypertext transfer protocol (http).

Tier 2 file communication techniques include downloading, streaming and adaptive streaming.

Tier 2 adaptive rendering assumes a full-sized GUI.

Set-top box 33, PC 42, phone 43, tablet computer 60, PC 64 and PC 69 are examples of Tier 2 devices.

Tier 3 communication channel characteristics include low bandwidth cellular data.

Tier 3 devices include mobile devices lacking a data plan.

Tier 3 software provides local functions only, that is, there is no web browser.

Tier 3 notification methods include SMS.

Tier 3 file delivery methods include MMS.

Tier 3 file communication techniques include downloading.

Tier 3 adaptive rendering does not occur, since Tier 3 devices lack browsers.

Phone 66 is an example of a Tier 3 device.

Tier 4 communication channel characteristics include voiceband channels, provided via circuit-switched telephone network 20, or voice over Internet protocol (VOIP) provided via data network 10.

Tier 4 devices include conventional wireline telephones and cellular telephones without SMS.

Tier 4 software does not exist.

Tier 4 notification methods include a call in the voiceband providing a message to call another phone number to listen to an audio file, and the ringing of a call that includes audio content.

Tier 4 file delivery methods include real-time content delivery.

Tier 4 file communication techniques include a voiceband channel.

Tier 4 adaptive rendering does not exist.

Phone 68 is an example of a Tier 4 device.

Progressive registration will now be discussed.

A conventional consumer-oriented service requires a user to subscribe to gain access to the functionality of the service. In contrast, the present invention recognizes that there are many people who do not want to actively subscribe, and yet their friends and co-workers would like to share information with them. Furthermore, even someone willing to subscribe prefers the subscription process to be as fast as possible. Accordingly, the present invention provides for passive registration, in which MSS 70 gathers information about a user but does not require the user to provide any information, and for active registration, in which a user provides certain information to gain access to certain functions, such as the abilities to upload, subscribe and view previously received content.

Further, the present invention generally asks for information only when it is about to be used to provide functionality to the user. Of course, a user may voluntarily provide additional information whenever the user chooses to do so. It is helpful to consider a continuum, starting from a completely unknown user to a passively registered user to an actively registered user ending with a fully registered user. Information that is gathered, as needed, during passive registration includes:

- a phone number for a user that was provided by another user, typically as the destination for content that the other user wishes to share;
- a phone number associated with device characteristics detected for playback;
- user preference information provided for a specific instance of media reception may be saved as a default preference. In one embodiment, this information is saved forever. In another embodiment, this information is saved for only a predetermined time interval, measured in calendar time or by number of downloads, to encourage the user to actively register and avoid the need to re-enter their preferences at each time interval;
- a phone number associated with device characteristics detected for playback and having information about the device provided by the user, typically to enable receipt of specified content; and
- a phone number having notification preferences provided by the user, typically to enable receipt of specified content.

Information collected during active registration includes:

- an email address provided by the user, typically to enable uploading of content or to subscribe to content;
- a phone number provided by the user, typically to subscribe to content;
- a phone number associated with device characteristics provided by the user as always applicable to that device;
- a phone number associated with information about the communications data plan that the user has made available for that phone number;
- other email addresses provided by the user;
- other devices and phone numbers provided by the user;
- preferences provided by the user, such as:
  - what type of notification should be provided, such as only notifications of new videos and/or only notifications of updates to videos and/or only notifications about comments left by commenters, where filters can be set for the commenters such as:

only commenters from a personal contacts list;
only commenters within a user's geographic area; and/or
only commenters that are corporate users;
and filters can be set for the comments, such as:
only comments that have been viewed at least a predetermined number of times and/or
only comments left within a predetermined time of when a video is posted and/or
only a predetermined number of comments per video
when notifications should be provided, e.g., as they occur, at certain calendar intervals, or after a predetermined number of notifications have arrived;
which device notifications should be provided to, as a default;
for a particular subscription, when notifications should be provided and/or which device notifications should be provided to (different than the default device);
for media sent from other users, a default preference for chapter size;
for media sent to other users, default formatting choices such as background color, text color and font;
for media received from other individual (non-corporate) users, default formatting choices that override any formatting choices of the sending individual;
user preferences regarding notices. In some embodiments where notices are accumulated and then sent to a user as a batch, there is a "notice of notices" messages sent to the user from MSS 70 with a link to a page listing new notices since the last batch notice, and a link to the notice page for the previous batch notice;
other social networking site identities associated with the user;
friends and/or family contacts provided by the user, which may be organized into groups. For example, an individual user might define respective groups for friends, family and work colleagues. As another example, a corporate user might define groups by product or by characteristics of the contacts such as location;
work contacts provided by the user.

The above lists are exemplary, not exhaustive.

There are two main ways for a user to receive content from MSS 70. One way is for the content to be sent to that user by another user, on a case by case basis. The other way is for the user to subscribe.

Subscription will now be discussed.

Objects that can be subscribed to include a single file and a channel.

A single file is a particular content file that has been uploaded; subscribing enables the subscriber to receive updates to the file and/or comments left by others regarding the file. An Internet web page is provided for the file enabling all comments to be viewed, see FIG. 5.

A channel is a construct created by a user. The creator of the channel can upload multiple files, at various times, and subscribers will receive each uploaded file when it is added to the channel. The creator can enable commenting, and subscribers can subscribe to comments. A comment can be text, graphic information, photographic information, audio or video.

Generally, subscribing is accomplished by the would-be subscriber either sending an SMS message to MSS 70, such as "757575 BrandX NewShoeChannel START" where "757575" is the SMS address of MSS 70, or by clicking on a button at a website, such as a button at a website for BrandX enabling a subscription to its NewShoe channel.

Figure 2:
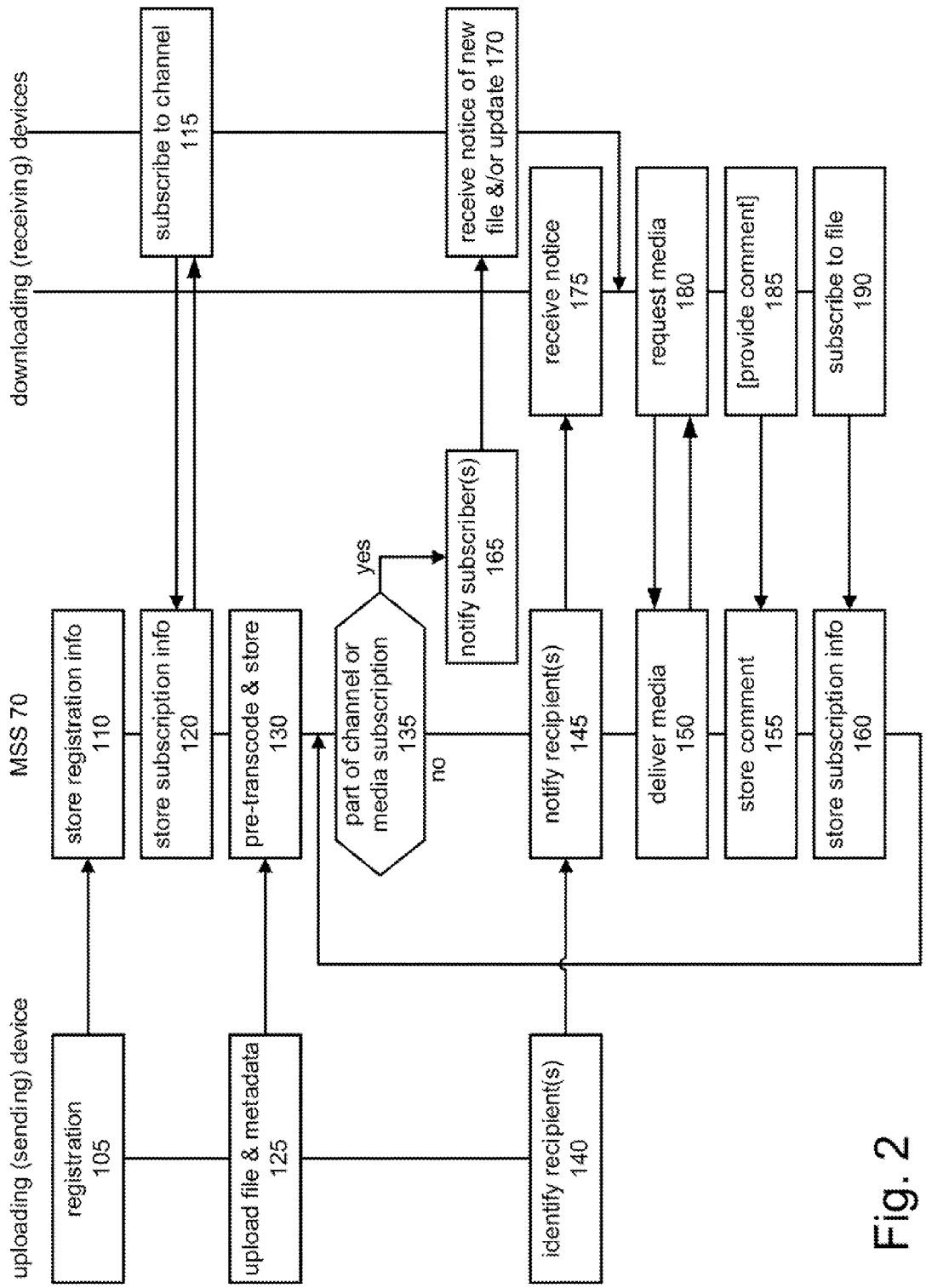
FIG. 2 is a flowchart showing subscription and progressive registration.

FIG. 2 is a flowchart showing subscription and progressive registration.

At step 105, the uploading device, such as phone 62 or PC 42, actively registers at MSS 70 by providing an email address. For example, the uploading device may be associated with a corporation named Brand X. Via advertising, Brand X encourages people to subscribe to its media channel. As an example, assume Brand X produces trendy advertising videos, and allows people to subscribe to its advertising video channel.

At step 110, MSS 70 receives and stores the registration information for the uploading device.

At step 115, the downloading device, such as phone 62 (when it is not the uploading device) or phone 66 or PC 64, sends a channel subscription message to MSS 70. If the message is sent via email, it may be of the form "BrandXsubscribe@MSS70.com"; if sent via SMS, it may be of the form "start" addressed to "757575 BrandX advids". The action of providing an address, that is, the originating address of the subscribe request, serves as active registration for the downloading device, if it is not already registered at MSS 70.

At step 120, MSS 70 receives the subscription request, and replies with an acknowledgement message and/or welcome video.

At step 125, the uploading device uploads a media file, which may be video, photographic, audio, or other such as Powerpoint or Flash video. As used herein, video includes video and accompany audio, and/or video without audio. The uploading device also may provide metadata data for the file, such as a title, author name, creation date (as opposed to uploading date that is automatically provided by MSS 70), short description, descriptive keywords, mobile keywords, channel that the file should be associated with, for example, "advids" or "draftvids", latitude and longitude of the uploading device that the file was uploaded from (if applicable), the data network address (uniform resource identifier) for a file uploaded from a third party website (if applicable), and so on.

At step 130, MSS 70 receives the source file and metadata, stores the source file and metadata, pre-transcodes the source file and stores pre-transcoded versions of the source file. Transcoding is discussed in detail below with regard to FIGS. 8A, 8B and 22.

At step 135, MSS 70 checks to see whether the just-transcoded file has been subscribed to by anyone.

If the file has been subscribed to, individually or as part of a channel, at step 165, MSS 70 sends a notice message to the subscribers that content is available. For each subscriber, the notice message is sent in accordance with the subscriber's preferences, if any. At step 170, the subscriber receives the notice message, and continues at step 180. The form of the notice message depends on the tier of the receiving device. When the receiving device is Tier 1 or Tier 2, the notice is an email or a "push" notification to an application executing on the device. When the receiving device is Tier 3, the notice is an MMS message with embedded content. When the receiving device is Tier 4, the notice is a phone call, with the ringing serving as notice.

For devices that support multiple notification methods, the notice method may be directly determined by a user in their registration preferences, or may be indirectly determined. An instance of indirect determination is downloading a native application; this results in a default push notification, to avoid confusing the user with a link that instantiates a web browser.

At step 140, the uploading device provides, to MSS 70, identification information for parties with whom the content is to be shared. The identification information is a phone number or an email address or both.

At step 145, MSS 70 receives the recipient identifying information, and, similar to step 165, sends one or more notices to the identified recipients that content is available. More specifically, the notice is sent to the receiving device associated with the identifying information.

At step 180, the receiving device requests the media. For a Tier 1 or Tier 2 device, the request is a message sent to MSS 70, or clicking on a hyperlink provided in the notice message. For a Tier 3 device, the request is opening the MMS message. For a Tier 4 device, the request is picking up the telephone (going to an "off hook" condition).

If the receiving device is a Tier 1 or Tier 2 device as yet unregistered with MSS 70, then receiving the request message from the device is an instance of collecting passive registration information, namely, the phone number or email address that originates the request.

At step 150, MSS 70 delivers the media to the requesting device. To do this, MSS 70 may need to collect information about the characteristics of the requesting device, as discussed below with regarding to the downloading process.

At step 185, the receiving device optionally provides a comment relating to the file to MSS 70. At step 155, MSS 70 stores the comment in association with the file. Although not shown in FIG. 2, it will be appreciated that MSS 70 also checks whether there are any subscribers that the comment should be delivered to, similar to step 135, and if so, similar to step 165, delivers notice of the comment.

At step 190, the receiving device optionally subscribes to the file, assuming that the file was forwarded to the receiver. This is an instance of active registration. At step 160, MSS 70 receives and stores the subscription information.

Although not shown in FIG. 2, the receiving device may optionally share the content with other parties by providing identification information for the parties, similar to step 140.

Figure 3:
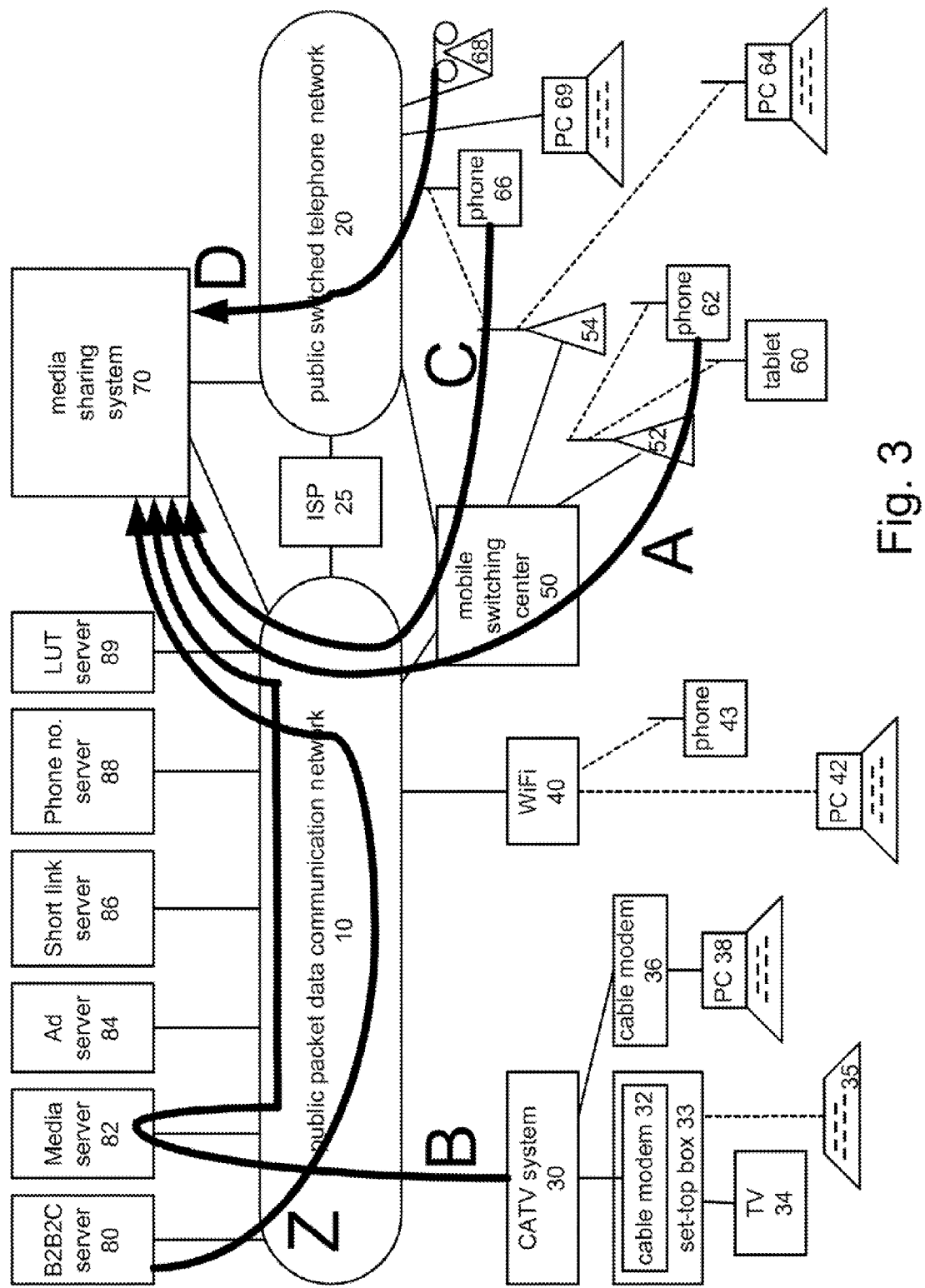
FIG. 3 is a block diagram indicating media uploading paths.

FIG. 3 is a block diagram indicating media uploading paths. Four paths A, B, C, D are shown, corresponding to the four tiers of devices, demonstrating the variety of uploading capability supported by MSS 70. Path Z is also shown, corresponding to bulk uploading.

Path A is from phone 62 via MSC 50 and data network 10 to MSS 70. Phone 62 is a Tier 1 device, and uploads a file by sending it as an attachment to a conventional data network email, such as a simple message transfer protocol (SMTP) email. Typically, the software for phone 62 allows its user to select from sending SMTP email, an SMS message or an MMS message.

At MSS 70, verification of the uploaded content can be by one or more techniques, including (a) the email is sent to "me@MSS70.com" from an email address that is registered with MSS 70, if there is no match to a registered email address, MSS 70 asks the uploader if he or she wishes to add the email address to his or her registration information, an example of progressive registration; note that an account may have several email addresses registered for uploading privileges; (b) the email is sent to "username.pin@MSS70.com", where "pin" is a multi-digit personal identification number, and the originating email address matches the email address associated with the pin; (c) the email is sent to "me@MSS70.com", MSS 70 responds by sending a confirming email to the registered email address, and if confirmed, decides that the upload is valid for the account.

Instead of the originating device being phone 62, it could be PC 42, a Tier 2 device. Media creation software for personal computers is widely available, such as Apple iMovie, Apple FinalCutPro or Adobe Photoshop for photographs. The uploaded media may have been downloaded to PC 42 from a web site.

Path B is from set-top box 33 via CATV system 30 and data network 10 to MSS 70. Set-top box 33 is a Tier 2 device, and uploads a file by going to a web site, such as provided by media server 82, and selecting a file for sharing.

An additional upload path, not shown in FIG. 3, is for a device, such as a PC or mobile phone, having a locally stored file, to go to a web site interface provided by MSS 70, and to upload the file using http protocol via data network 10.

Path C is from phone 66 via MSC 50 and data network 10 to MSS 70. Phone 66 is a Tier 3 device, and uploads by sending an MMS message with embedded content. Phone 66 has software to record and edit video. It is noted that such phone, software usually enables the user to upload the video to a local PC, and then, as a Tier 2 device, the PC could upload via data network 10 to MSS 70.

Path D is from phone 68 via telephone network 20 to MSS 70. Phone 68 is a Tier 4 device, and uploads by making a phone call to MSS 70 and recording content such as spoken words into a storage facility at MSS 70. Path Z is from B2B2C server 80 via data network 10 to MSS 70. B2B2C server 80 is a content syndication server that is part of a workflow system for a corporate user of MSS 70. The corporate user generates new content videos from time to time, along with metadata for the content videos, and uses the media really simple syndication (mRSS) protocol to send the content videos and accompanying metadata to a bulk uploading application programming interface (API) executing at MSS 70, so that the uploaded videos will be pre-transcoded (see FIG. 7A step 235).

The metadata provided from B2B2C server 80 indicates when the content videos should be made available for downloading, such as immediately, at a predetermined time or at a to-be-determined time, on which channel(s), and optionally controls downloading by recipient characteristics, e.g., only recipients in a particular geographic area.

A corporate user may conduct a promotion or contest, and make the bulk uploaded videos available in association with the promotion or contest.

These uploading paths are exemplary, not exhaustive.

Uploading files to MSS 70 can occur using any standard protocol, including but not limited to web based distributed authoring and versioning (WebDAV), simple object access protocol (SOAP), file transfer protocol (FTP), trivial FTP (TFTP), secure FTP (SFTP), or news network transfer protocol (NNTP).

As used herein and in the claims, "uploading" includes file by file uploading in response to direct action from a human, and/or bulk uploading from a content syndication system operated by a third party.

Figure 4:
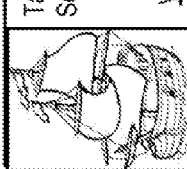
FIG. 4 is a diagram of a screen display showing content available to a user.

FIG. 4 is a diagram of a screen display showing content available to a user.

When a registered user signs in at a website provided by MSS 70, MSS 70 sends a web page to the user having media tab 400. When the user clicks on media tab 400, the display shown in FIG. 4 is prepared by MSS 70 and sent to the user.

Area 405 shows the folders and sub-folders created by the user. A user can designate a folder or sub-folder as a channel, and others can then subscribe to new material, updates to existing material and/or comments on material in that channel. As indicated by boldface in FIG. 4, the user has selected "All" as the media to display, so that all media uploaded by, or received by, the user will be displayed.

When a user actively registers at MSS 70, all of the material previously shared to that user is available to that user. That is, MSS 70 keeps track of media sent to passively registered users. This is another example of progressive registration.

Area 410 provides options for sorting the media, here, by date, number of plays, geographic location or length. As indicated in boldface, the user has selected "plays". In one embodiment, the number of plays means how often the media has been played across the entire community of users of MSS 70; in another, the number of plays means how often the media has been played by this user. In some embodiments, a user can adjust their registration information so that number of plays is computed based on the number of views by the user and all of the contacts that the user has registered with MSS 70.

Each media file corresponds to a row in the central part of the display of FIG. 4.

Element 415 is a thumbnail image corresponding to the media file. When the file is a video, play button 416 is superimposed on the thumbnail; clicking play button 416 causes the media to play in the area of element 415.

Element 417 is the filename for the media file. Element 418 identifies how the media file was provided to MSS 70. The uploader-provided title for the media file, if any, is shown in some embodiments, along with an uploader-provided short description for the media file, if any, and uploader-provided descriptive keywords and mobile keywords, if any.

Elements 419-423 are function buttons that the user may click on.

Element 419 generates a large pop-up window for better viewing of the media. If the video is associated with a media player that can be embedded in other web pages, the media player is modified to have a send-to-phone capability built into the media player, with phone number input and send to phone action displayed as an overlay in the lower portion of the video window.

Element 420 generates a pop-up window enabling the user to designate recipients with whom the media file should be shared.

Element 421 identifies the number of comments left by other users for this file.

Element 422 provides a pop-up window, enabling other websites to link to this file.

Element 423 enables the user to delete this file.

Area 430 shows the device types and third party applications that recently viewed this file. In this case, a non-keypad phone icon 431, a flip-type phone icon 432 and a social network icon 433 are shown. Other device types (not shown) include a personal computer, a tablet computer and a set-top box for Internet TV. As used herein, a social network views a media file when a request for the media file originates from a website associated with the social network or a device application provided by the social network. An example of a social network is Facebook.

Clicking on one of the icons 431 or 432 or 433 generates a pop-up window showing (a) a window with a media player corresponding to how the media will appear on the device, (b) statistics relating to how many users and which users have accessed media on the device, with device data sortable by various criteria such as popularity, time last viewed and so on. This information may influence a user's decision on how to share the media.

Area 440 shows an image of the user who sent the media to the current user. If the user is a corporate user, then the image is usually the logo of the corporation.

Area 445 provides more descriptive information about the media file. In this case, the descriptive information includes when the media was provided to this user, how many times the media has been viewed summed across everyone who the sending user sent the media to, and the user name of the user who sent the media.

Figure 5:
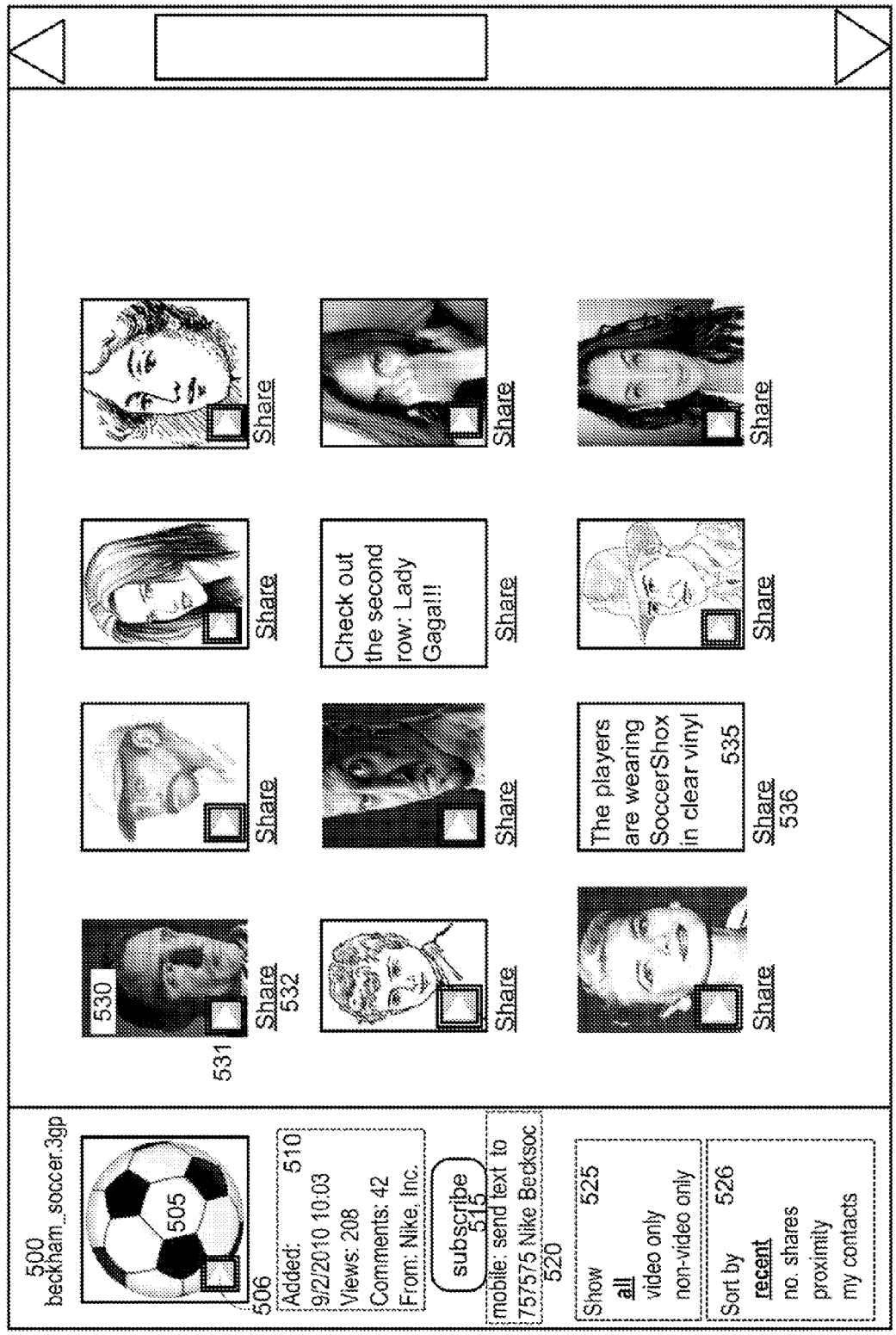
FIG. 5 is a diagram of a screen display showing comments on one of the content items in FIG. 4.

FIG. 5 is a diagram of a screen display showing comments on one of the content items in FIG. 4. Specifically, if the user clicks on the comments button corresponding to the soccer ball thumbnail, the display shown in FIG. 5 is generated by MSS 70 and delivered to the user.

Element 500 is the filename.

Element 505 is a thumbnail of the file. When the file is a video file, play button 506 is superimposed on the thumbnail.

Area 510 provides information about the file.

Subscribe button 515 enables a user viewing this file to subscribe to the file, when the uploader has designated the file as an object that can be subscribed to.

Area 520 provides instructions for how a user can subscribe to this file using a SMS message from their mobile phone, namely, by sending a message "757575 Nike Becksoc START". This illustrates the hierarchical use of mobile keywords. Specifically, "757575" is the address for MSS70, "Nike" is the primary mobile keyword, and "Becksoc" is a secondary mobile keyword defined by the file uploader, Nike. In some cases, tertiary mobile keywords are also used.

Area 525 enables the viewer to select comments by type of comment, here video, non-video or all.

Area 526 enables the user to sort the comments by various criteria, here, how recently the comment was made, how many times the comment was shared, proximity of the comment maker to the user, and whether the comment maker was part of the user's contacts list.

The main area of FIG. 5 is a "video board" showing thumbnail images of comments left by various users. Typically, a user records himself or herself speaking a comment, so the thumbnails are headshots of the users. In one embodiment, only headshot type videos may be posted as comments, which is automatically enforced by MSS 70 looking for facial structures in the images. Another embodiment permits uploading of any video, graphic, photograph or text as a comment. Comments are uploaded from storage associated with an uploaded device, or media previously uploaded by the commenter may be designated by the commenter as a comment.

Element 530 is a thumbnail image of the comment, with play button 531 superimposed thereon. Share button 532 is associated with the comment file, so that the comment by itself can be shared. In some embodiments, sharing the comment file automatically also shares the file that the comment is related to.

Instead of a video file, a commenter can provide a text or graphic or photographic comment.

Element 535 is a text comment, and share button 536 is associated with the text comment, in similar manner as share button 532.

In some embodiments, underneath each comment there is descriptive text corresponding to the sort criteria in area 526.

FIGS. 6A and 6B are diagrams of screen displays showing content with geographic information. When a user clicks on Geo tab 401 in FIG. 4, MSS 70 creates the display shown in FIG. 6A and sends it to the user. Note that the device for the user can be a PC or a mobile phone.

The display in FIG. 6A shows a world map with a pin for each media file sent to the user (pins with circular white heads), received by the user (pins with circular grey heads), or sent to the user from MSS 70 (pins with square grey heads), along with the location of the sender. In some embodiments, a user can restrict the display to only one type of pin.

The geographic information associated with a media file is referred to as its "geotag". A file can be geotagged according to one or more of the following techniques:

via (a) GPS devices; (b) triangulation—using three nearby communication addresses to "triangulate" a physical location; and/or (c) "geoIP" (which can determine country, region, city, postal code, area code a visitor is coming from, computed using a manually gathered database of locations mapped to IP addresses);

via manual input for geo coordinates (i.e., manual placement of a pin on a map for a photo or video); or via extraction of geographic coordinates from an existing media item (such as photo or video previously geotagged on another device)

In one embodiment, clicking on a geographic area in FIG. 6A causes MSS 70 to generate a display such as shown in FIG. 6B, that is, a more detailed view of the indicated geographic area.

Clicking on a pin generates a pop-up window containing a thumbnail image of the file and descriptive text for the file, that is meta-data for the file, and enabling download of that file to the current device.

The displays of FIGS. 6A and 6B have controls, not shown, similar to areas 525 and 526, enabling selectivity in media display and sorting of the media by various criteria.

Additionally, clicking on the proximity filter cycles through the content files starting with the geotagged content file closest to the location of the file being viewed. In another embodiment, the proximity filter considers distance to the user instead of location of the file. The location of a user may be determined from the user's registration information, or from geographic information available from a device being used by the user, such as GPS coordinates or nearest WiFi station.

Figure 7A:
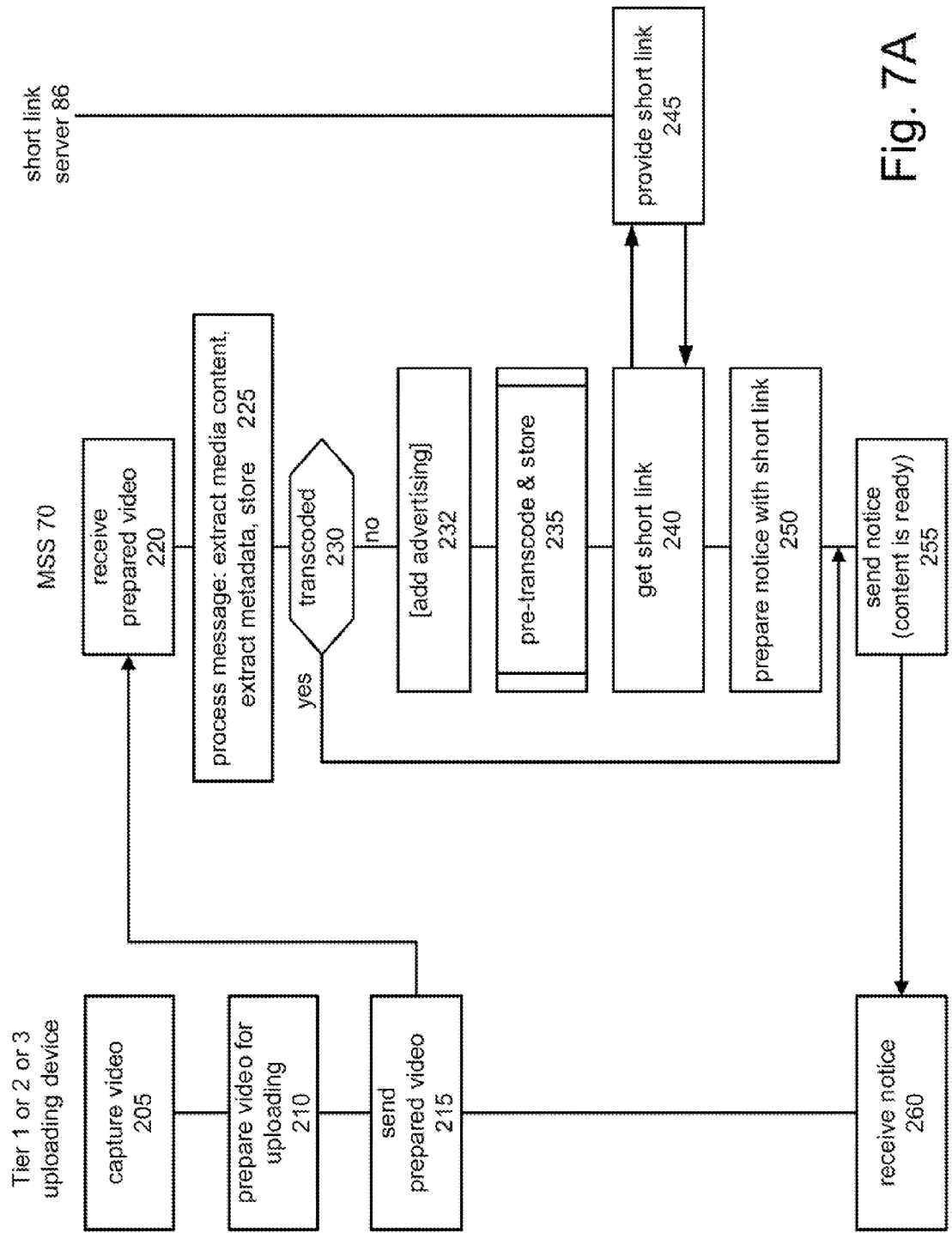

FIG. 7A is a flowchart showing content uploading for devices that are in Tier 1, Tier 2 or Tier 3.

At step 205, the uploading device captures a video file, either using local video file creation software, or by downloading the video file from a website or another device such as a video camera.

At step 210, the uploading device prepares the video for uploading. For a Tier 1 or Tier 2 device, the video file is attached to a SMTP email. For a Tier 3 device, the video file is embedded as content in an MMS message.

At step 215, the uploading device sends the prepared video to MSS 70.

At step 220, MSS 70 receives the email or MMS message with the video content.

At step 225, MSS 70 processes the received information to extract the video content and the meta-data, then stores the video content and the meta-data. In some cases, processing includes binary file processing to correctly extract the video content from the SMTP email. Meta-data includes textual information such as title, short description, descriptive keywords, author name, creation date and so on. In some embodiments, the meta-data includes a thumbnail image for the video file. Alternatively or additionally, the uploading user can provide meta-data for an uploaded file through a website interface (not shown).

At step 230, MSS 70 determines whether this file has already been transcoded, such as by comparing the filename with stored file names or by digital fingerprinting of the file. If so, MSS 70 stores a pointer to the already transcoded file, and proceeds to step 250.

Figure 17:
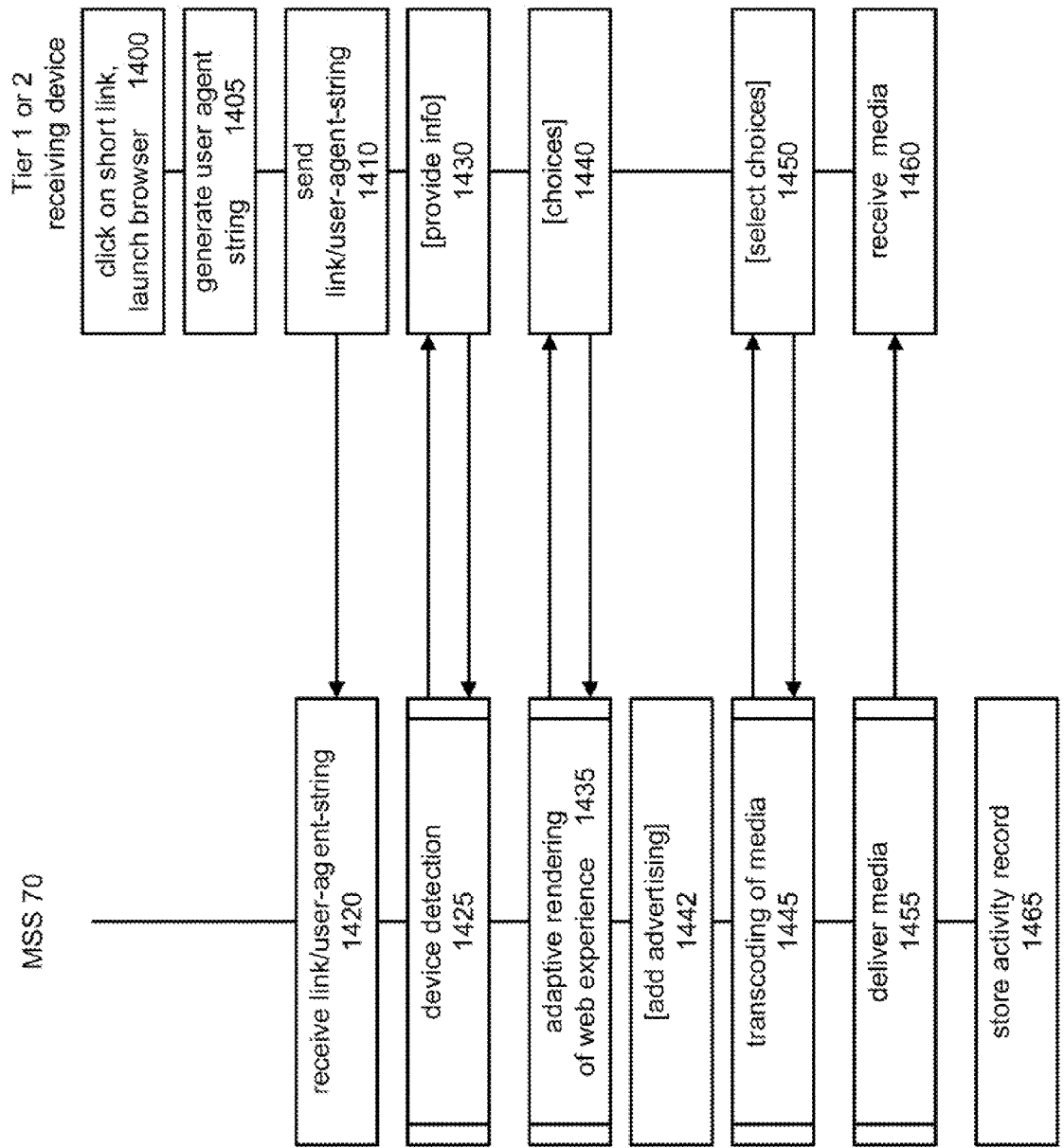
FIG. 17 is a flowchart showing a send to phone operation initiated by a receiver.

At step 232, MSS 70 determines whether advertising, referred to as static advertising to distinguish from on-demand advertising discussed at FIG. 17 step 1442, should be added. When the media is a video file, the advertisement may precede (pre-roll) or succeed (post-roll) or be inserted (mid-roll) into the video file, or be an overlay to the video, where the overlay can be static for a brief duration or can vary over the duration of the video. The advertising, if any, undergoes similar transcoding and delivery as the media file. The ad selection can occur based on characteristics of the media content and/or media metadata and/or uploading user. Static advertising cannot depend on recipient characteristics as the recipient is unknown when the static advertising is inserted. In contrast, on-demand advertising can be chosen based on recipient characteristics (see FIG. 17 step 1442).

Figure 8B:
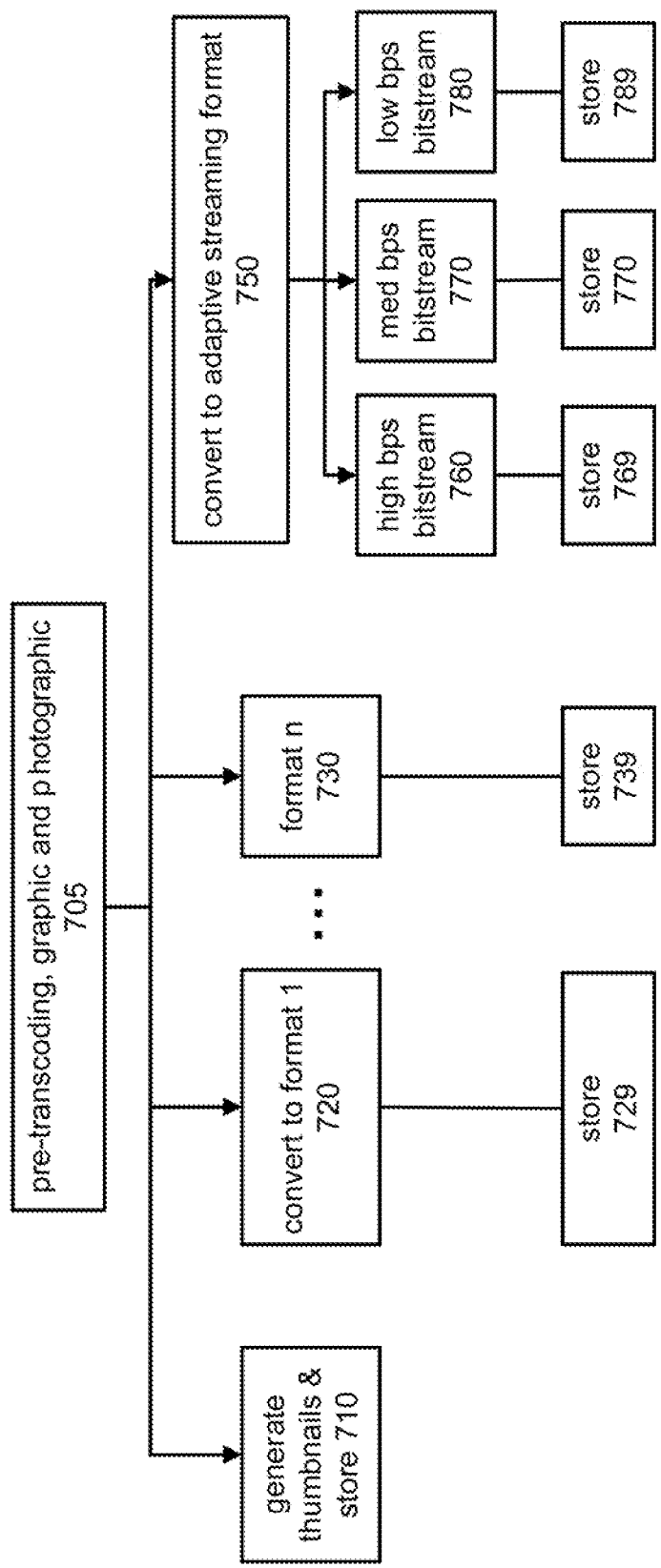

At step 235, MSS 70 pre-transcodes the file, shown in detail in FIG. 8A for a video file and in FIG. 8B for a graphic file. In some embodiments, MSS 70 pre-processes the audio track of a video file to remove audio noise, increase the amplitude, adjust the frequency response, normalize the audio track and/or apply dynamic range compression, resulting in improved audio quality.

At step 240, MSS 70 requests a short link from short link server 86. At step 245, short link server 86 provides a short link corresponding to the file. For example, "www.MSS70.com/BrandX/shoes/viper_hightop_famous_athlete.flv" might be shortened to "bit.ly/a1b2c3". For compact message formats such as SMS, it is more convenient to have a short filename even if the filename is apparently random alphanumeric characters, than a longer filename that is more memorable to a human.

At step 250, MSS 70 prepares a notice message to the uploading device that the content is ready for sharing, and may be accessed at the short link obtained for the transcoded file.

At step 255, MSS 70 sends the notice message to the uploading device. If the uploading device is a Tier 1 device, the notice message is sent as both an SMS message and a SMTP email; in some embodiments, only one type of notice message is sent. If the uploading user has set their registration preferences to a particular type of notice message, then the registration preferences are followed. If the uploading device is a Tier 2 device, then the notice message is sent as a SMTP email. If the uploading device is a Tier 3 device, then the notice message is sent as an SMS message.

FIG. 7B is a flowchart showing content uploading for a Tier 4 device.

At step 305, the uploading user places a call to MSS 70 by dialing a telephone number. At step 320, an automated voice response system at MSS 70 receives the call, and instructs the caller how to record content, such as pressing the star "*" key to start recording and stop recording.

At step 310, the caller generates an audio signal, such as by speaking a message, singing "Happy Birthday" and so on. At step 325, MSS 70 receives the audio signal and stores it. The user may also provide meta-data via speech, and MSS 70 converts the speech to text and associates the text with the stored audio signal.

At step 330, MSS 70 determines whether static audio advertising should be added. The advertisement may precede (pre-roll) or succeed (post-roll) or be inserted (mid-roll) into the audio file. The advertising, if any, undergoes similar transcoding and delivery as the media file.

At step 335, MSS 70 pre-transcodes the audio signal, as shown in FIG. 8A.

Steps 340 and 345 correspond to steps 240 and 245 of FIG. 7A.

At step 345, MSS 70 checks whether the caller is still on the phone. If not, at step 350, MSS 70 places a call to the caller.

At step 355, MSS 70 automatically generates a spoken message, using stored text or text-to-speech synthesis, informing the caller that their file is ready and providing the short link for the file.

At step 360, the caller receives the notice that the file is ready for sharing.

FIG. 8A is a flowchart showing pre-transcoding for video and audio files.

Processing begins at step 605, where MSS 70 begins two or more independent threads of processing, which can occur in parallel. The threads are generating one or more thumbnail images, transcoding to a predefined set of video formats and a predefined set of audio formats, and converting the file to adaptive streaming formats. In some embodiments, MSS 70 pre-processes the audio track of a video file to remove audio noise, increase the amplitude, adjust the frequency response, normalize the audio track and/or apply dynamic range compression, resulting in improved audio quality. MSS 70 has profiles for pre-transcoded files including the x-y resolution of the file, and a set of devices that the file is appropriate for.

At step 610, MSS 70 checks whether the user provided a thumbnail image when the file was uploaded. If not, MSS 70 automatically selects an image, such an image located a predetermined number of seconds into the duration of the video, as the thumbnail for the file. In some embodiments, MSS 70 enables the user to choose one of the video frames as the thumbnail image, or designate an entirely unrelated image as the thumbnail for the file. In some embodiments, MSS 70 enables the user to choose different images for different sizes of thumbnails. Then, MSS 70 stores the thumbnail, and this processing thread is complete.

At step 620, MSS 70 converts the source file to a first predefined format, such as mp4 at 800 kbps.

At step 622, MSS 70 checks whether the file is to be converted into chapters, such as by determining if the file size exceeds a predetermined threshold. If not, processing continues at step 629.

At step 624, MSS 70 suggests chapters, that is, shorter files that are quicker to transmit, to the user. The separation may be based on time, on scene changes or on other criteria. At step 626, MSS 70 enables the uploading user to adjust the chapter boundaries for a pre-transcoded file. The information may explicitly be provided by the receiving user for this particular instance of reception, or may passively be provided as a preference in the registration information of the receiving user. When a user first explicitly provides information, MSS 70 inquires if the user wishes to save this as a default preference, an example of progressive registration. As discussed below, for an on-demand transcoded file, the chapter boundaries can be adjusted by the receiving user either explicitly or passively via a profile preference.

In some embodiments, for long videos, MSS 70 enables an uploading user to divide the long video into separate videos linked together by a playlist for the separate videos. Each of the separate videos can be separately chaptered.

At step 628, MSS 70 divides the converted file into chapters.

At step 629, MSS 70 stores the converted file, or if chaptering has occurred, stores the chapters and pointers so that chapters are automatically delivered in the correct sequence.

For each additional predefined format, up to n video formats, corresponding steps are performed. Steps 630-639 correspond to steps 620-629, and for brevity, will not be discussed in detail. Other suitable video formats include mp4 at 512 kbps, flv at 2 Mbps for PCs (flv files cannot be chaptered), 3gp at 256 kbps, and m3u8 format at multiple bit rates. File formats may be optimized for downloading in full, for regular streaming, or for progressive downloading, where playback can begin before downloading is completed.

If the source file was an audio only file, steps 620-639 may be omitted.

At step 640, MSS 70 converts the video file to an audio-only file, useful for Tier 4 devices, generally in one audio format such as AMR format. The source file may be an audio-only file, in which case it is converted to the predefined audio file format. In some embodiments, there are multiple audio file formats. Steps 640-649 correspond to steps 620-629, and for brevity, will not be discussed in detail. In some cases, listening to an audio-only file provides incentive for a user to go to the MSS 70 website and view the entire video file.

At step 650, MSS 70 begins converting the source file to adaptive streaming formats. In one embodiment, for adaptive streaming, a high bit rate stream is at 820 kbps, a medium bit rate stream is at 320 kbps, a low bit rate streams is at 160 kbps, and an audio only stream is at 64 kbps. In some embodiments, there are multiple formats for adaptive streaming for various classes of devices. In an adaptive streaming format, the file is converted into segments of 5-10 seconds in length, with the segment boundary at the same place in each of the streams, so that a media player can switch between streams during playback, usually in accordance with characteristics of the communication channel. Segments of adaptive streaming files are quite distinct from chapters of regular files, and should not be confused.

The m3u8 format can be pre-transcoded or on-demand transcoded, depending on the receiving device.

FIG. 8B is a flowchart showing pre-transcoding for graphic and photographic files.

Processing begins at step 705, where MSS 70 begins two or more independent threads of processing, which can occur in parallel. The threads are generating a thumbnail, transcoding to a predefined set of image formats such as gif, jpg, png, bmp and tif, and converting the file to adaptive streaming formats. Conversion of graphic and photographic files is similar to conversion of video files, except that graphic and photographic files are not chaptered. Files converted for adaptive streaming are segmented.

MSS 70 has profiles for its pre-transcoded files including the x-y resolution of the file, and a set of devices that the file is appropriate for.

Step 710 corresponds to step 610 of FIG. 8A, and for brevity, will not be discussed in detail.

Steps 720 and 729 correspond to steps 620 and 629 of FIG. 8A, and for brevity, will not be discussed in detail.

Steps 730 and 739 correspond to steps 630 and 639 of FIG. 8A, and for brevity, will not be discussed in detail.

For certain legacy Sprint phones, image (jpg) files could not be provided as a link in an SMS message as the link would not work properly when the user clicked on it. So, a special format was defined and added to the set of n pre-transcoded file formats, wherein MSS 70 imposes a maximum size limit on the jpg file and provides a general content descriptor (GCD) file with descriptive text such as file size and a link to the size-restricted jpg file. Then, during sending to a receiving device (see FIG. 22 step 2020), when MSS 70 determined the receiving device is one of the relevant legacy Sprint, the GCD file is selected for downloading.

Steps 760, 769, 770, 779, 780 and 789 respectively correspond to steps 660, 669, 670, 679, 680 and 689 of FIG. 8A, and for brevity, will not be discussed in detail.

Figure 9:
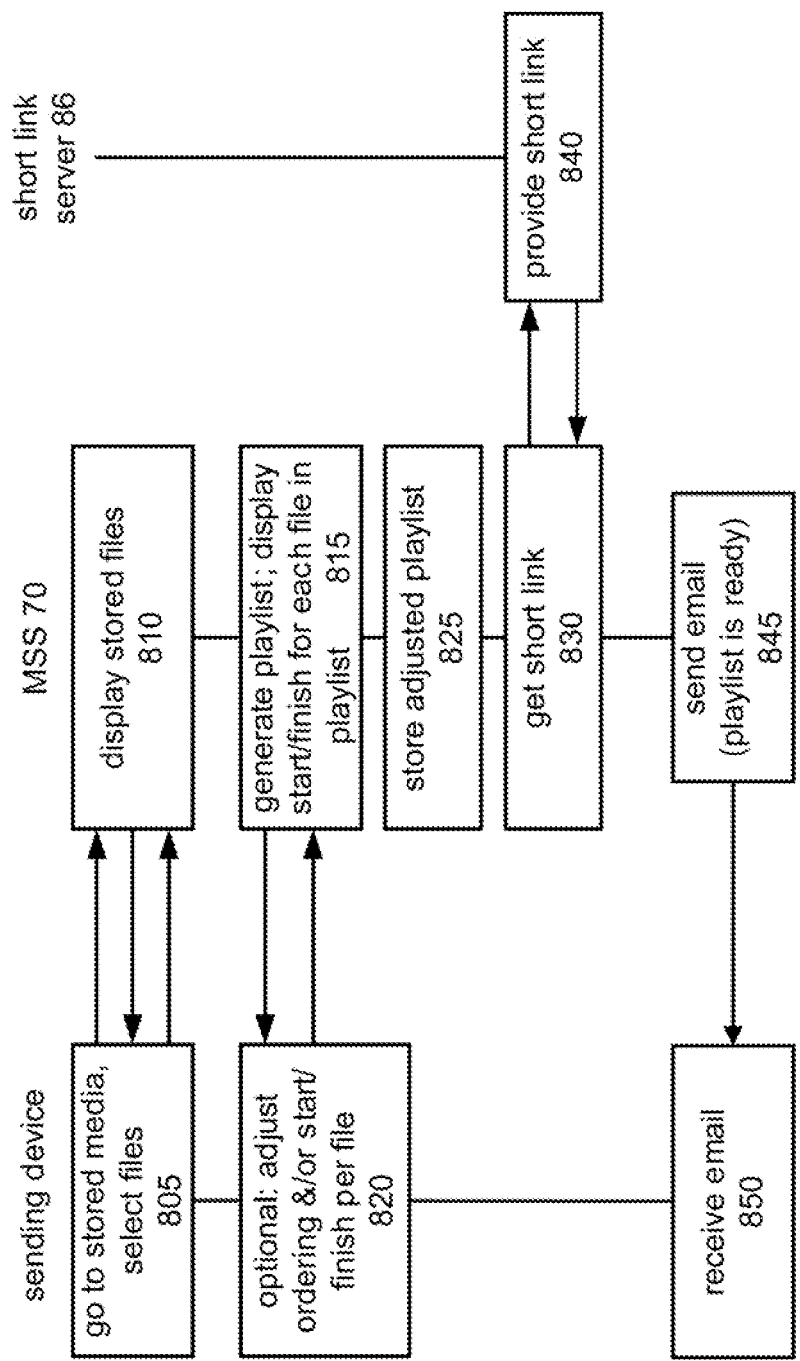
FIG. 9 is a flowchart illustrating creating a playlist from available content.

FIG. 9 is a flowchart illustrating creating a playlist from uploaded files.

Advertising added to a file can be formed as a playlist.

At step 805, the playlist author, via a sending device, which is a Tier 1 or Tier 2 device, goes to the website provided by MSS 70 and selects already uploaded media files for combination into a playlist.

At step 810, MSS 70 displays the already uploaded media files and receives the author's selection.

At step 815, MSS 70 combines the selected files into a playlist, displays the start and end frame for each file, and enables the author to adjust the file ordering and/or the start and finish of each file.

At step 820, the author optionally adjusts the file ordering and/or the start and finish of each file.

At step 825, MSS 70 stores the adjusted playlist.

Steps 830 and 840 correspond to steps 240 and 245 of FIG. 7A, and will not be discussed for brevity.

At step 845, MSS 70 prepares a message notifying the author that the playlist is ready for sharing and providing the short link associated with the playlist.

At step 850, the author receives the notification message.

Downloading of already uploaded files will now be discussed.

Figure 10:
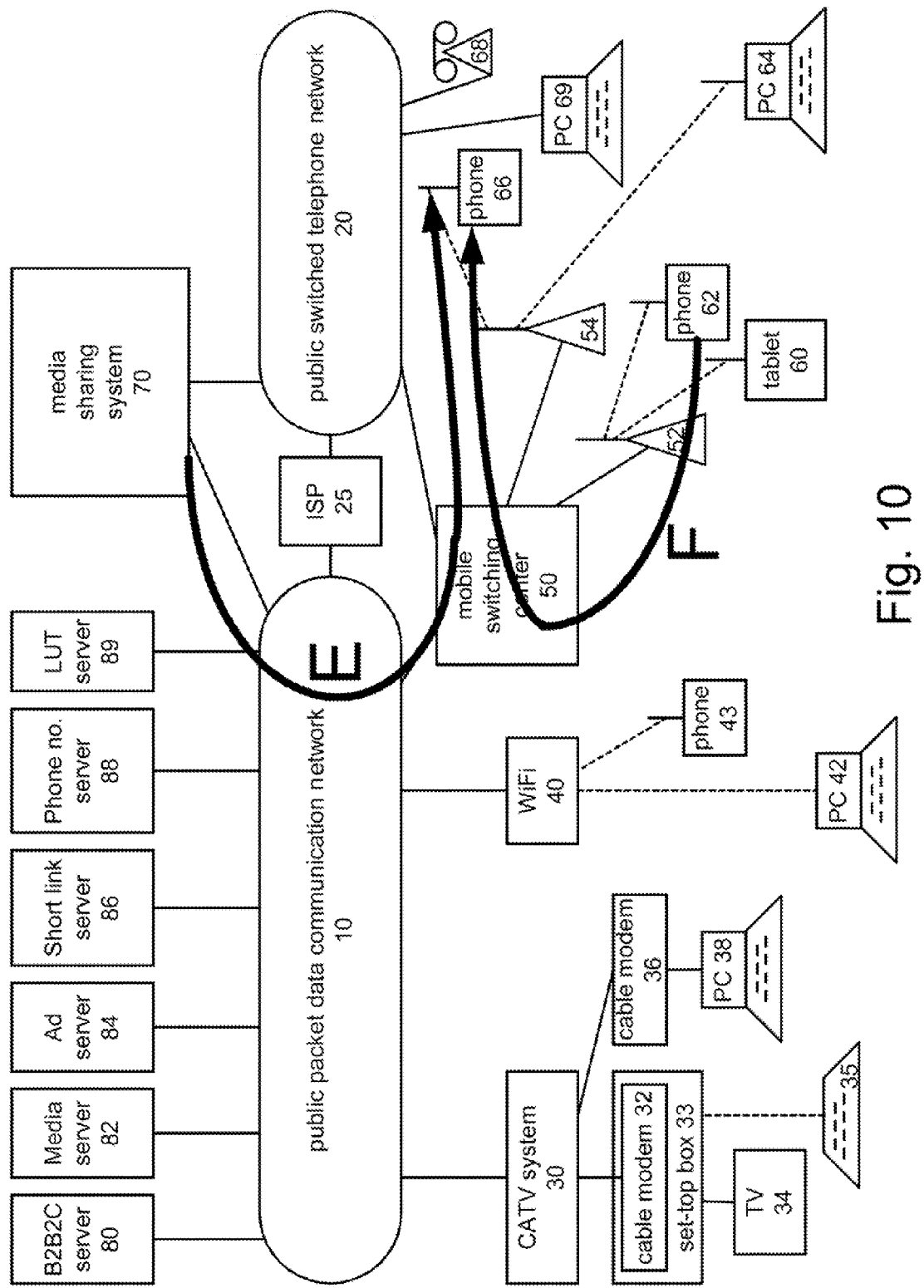
FIG. 10 is a block diagram indicating media downloading paths.

FIG. 10 is a block diagram indicating media downloading paths. Two paths E and F are shown.

Path E corresponds to downloading in response to a subscription, and downloading in response to instructions provided at the website of MSS 70, such as the send to phone interface. Additionally, a third party server such as media server 82 may provide a send to phone interface supported by MSS 70, in this case, instructions are sent from media server 82 to MSS 70 to effectuate the download. In this path, media is delivered from storage at MSS 70 to the recipient device. Due to the large community of possible recipient devices, substantial processing is involved in downloading, as discussed below.

An advantage of the present invention is that a large community of possible recipient devices is supported in a manner generally transparent to the uploading user.

Path F corresponds to downloading when a recipient of a send to phone message forwards that message to another recipient. In this path, the first recipient sends the notice message to the second recipient. If the first recipient is a Tier 3 device, the forwarded message includes embedded media content. If the first recipient is a Tier 1 or Tier 2 device, the forwarded message includes a short link, which the second recipient clicks on to receive the media content, and as described below, the media content is suitably presented for the device of the second recipient, even though the device of the second recipient has different characteristics than the device of the first recipient.

An advantage of the present invention is that first recipients can simply forward links and be assured that MSS 70 will take care of the details to appropriately format the content for whatever types of devices the second recipients have. If the second recipients happen to be actively registered at MSS 70, then their predefined preferences influence how content is delivered to them, without any effort from the first recipients.

These downloading paths are exemplary, not exhaustive.

Figure 11:
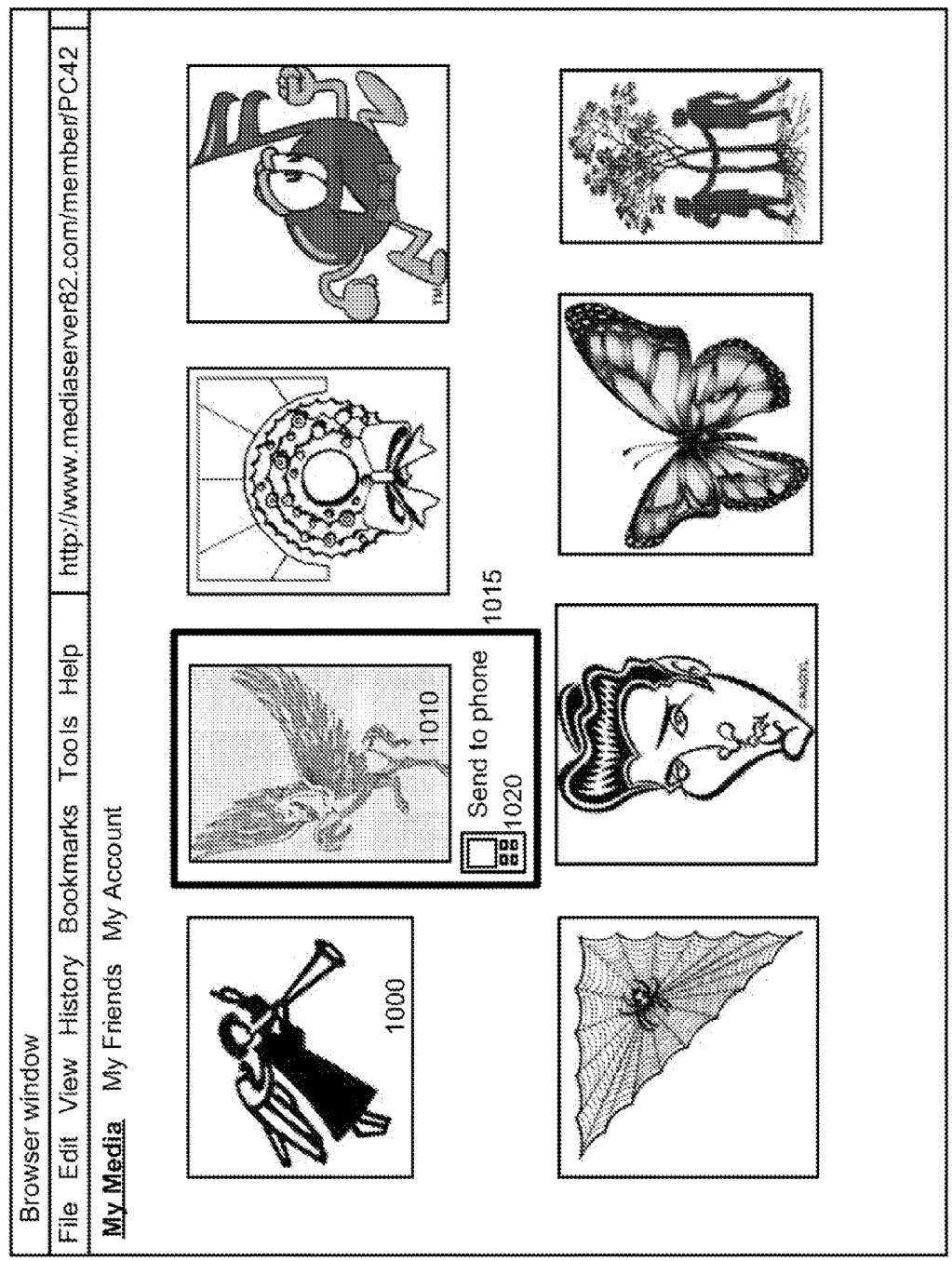
FIG. 11 is a diagram of a screen display showing content at a third party website.
Figure 12:
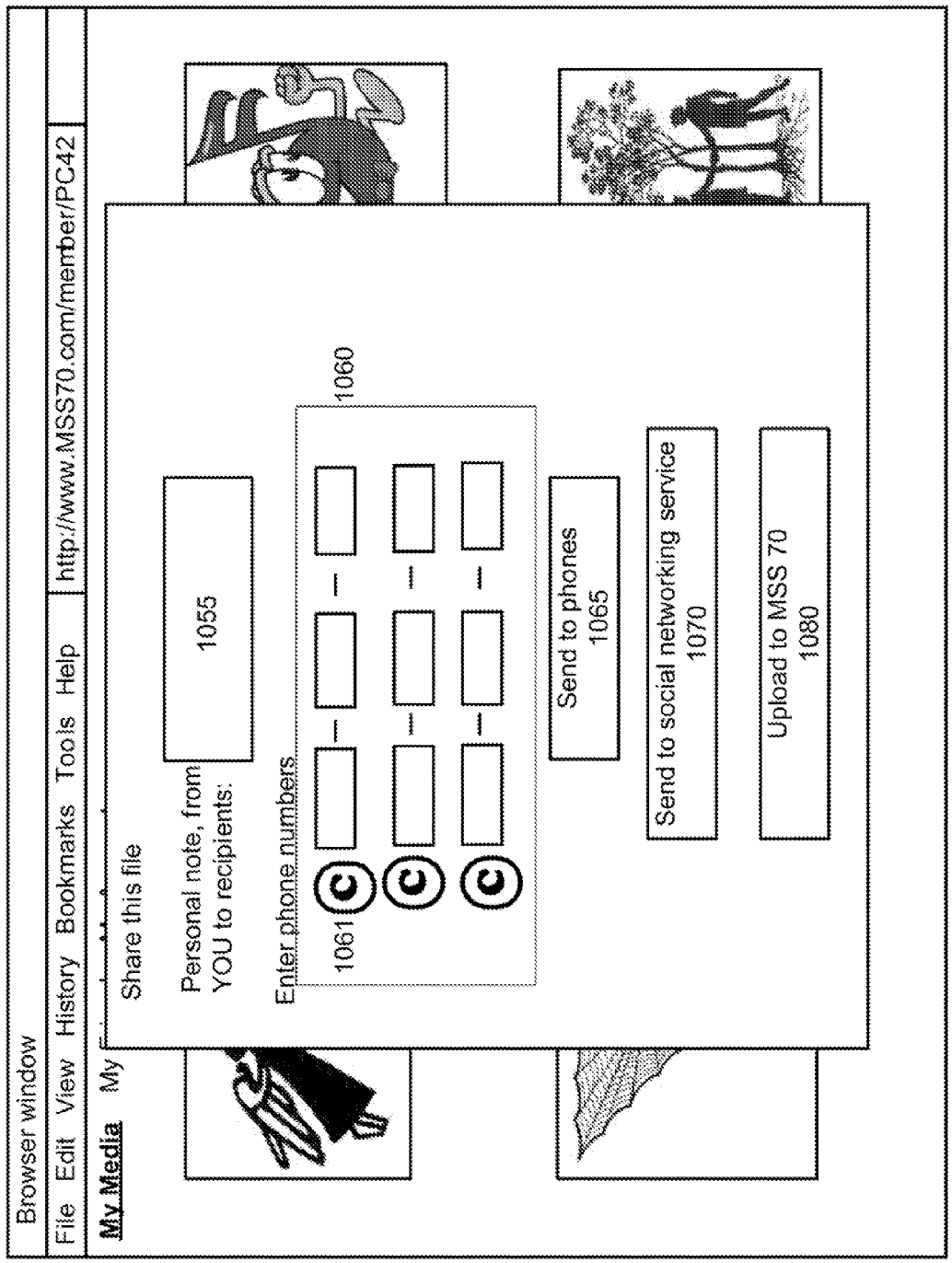
FIG. 12 is a diagram of a share-to-phone interface.

FIG. 11 is a diagram of a screen display showing content at a third party website, such as media server 82. Thumbnail images, such as thumbnails 1000 and 1010, are displayed on a web page. The file itself may be graphic, photographic or video. When the user hovers their mouse over a thumbnail, border 1015 with send to phone icon 1020 pops up. The results of clicking the icon are shown in FIG. 12.

A send to phone application programming interface (API) executes at MSS 70. The send to phone API accepts requests from other programs so that the functionality of MSS 70 can be made available through a third party website such as media server 82. In other words, the third party website can enable sharing of its videos, photographs and graphics to hundreds of types of mobile devices while the third party website itself is unconcerned with the details of any of the various types of mobile devices. Users of the third party website do not have to actively register at MSS 70 to either send or receive files from the third party website that uses the send to phone API.

The send to phone API at MSS 70 can also be used by a third party mobile phone application, that is, the send to phone API can accommodate traffic from a website application or an application executing in a mobile phone.

The send to phone API enables any of the media sharing functions available at the website associated with MSS 70 to be accessed from other applications that use the send to phone API, such as updating file metadata, adding contacts and so on.

FIG. 12 is a diagram of a screen display showing send to phone interface 1050. A user does not need to be registered at MSS 70, in any way, to use the send to phone interface.

Area 1055 enables the user to enter an optional text message as a personal note to the recipient. If the user does not provide a personal note, and is not registered at MSS 70, then the sender of the file will be anonymous to the recipient.

Area 1060 enables the user to enter phone numbers of the recipients. By clicking on icon 1061, the user can select one of the contacts from their contacts book. In one embodiment, the contacts are stored at MSS 70 as part of the user's registration information. In another embodiment, the contacts are stored in the user's device and the contact information for a selected recipient is uploaded to MSS 70 via the interface at media server 82.

Button 1065 is actuated by the user to transmit the send to phone information to MSS 70. If real time transcoding is needed due to this being the first time that the file has been selected for sharing, or because of the characteristics of the receiving device, then the sending may take some time. In one embodiment, MSS 70 ignores repeated clicks of the send button while transcoding is occurring. In another embodiment, the send button blinks while transcoding is occurring, and possibly an hourglass icon pops up on the screen.

Alternatively or additionally, the user can send the file to a social networking service by actuating button 1070, which provides a list of social networking services, and the user then selects from among the list.

Alternatively or additionally, the user can upload the file to their account at MSS 70, perhaps for inclusion in a playlist. It will be recalled that a user must be actively registered to upload a file to MSS 70.

If a user who is not actively registered at MSS 70 attempts to use button 1070 or 1080, MSS 70 invites the user to register to use the functions. This is an example of progressive registration.

Figure 13:
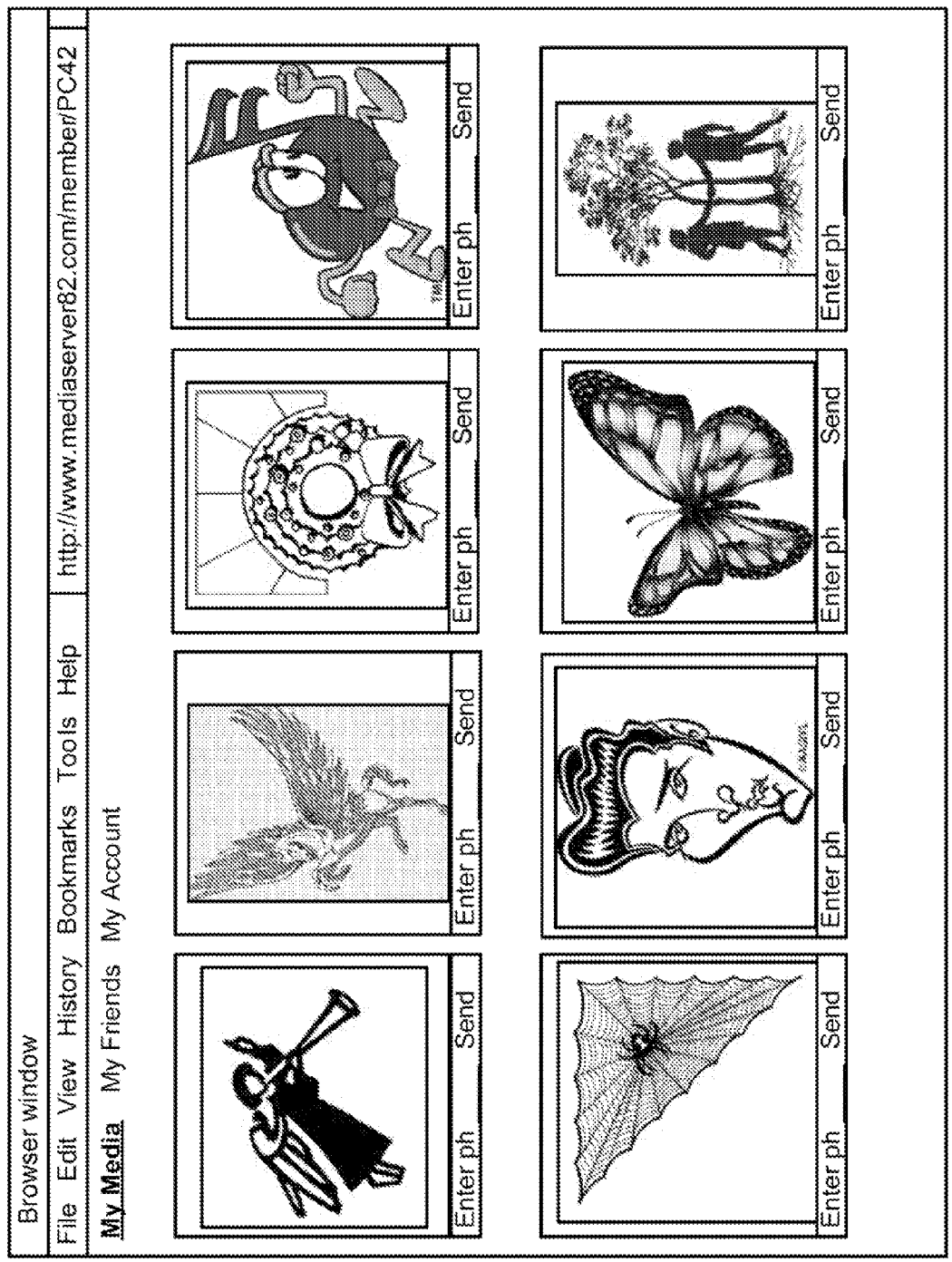
FIG. 13 is a diagram of a screen display showing content framed with a sharing interface.

FIG. 13 is a diagram of a screen display showing content framed with a sharing interface provided at media server 82 instead of the screen display of FIG. 11. Instead of hovering over the thumbnail to access the send to phone functionality, the thumbnail is presented in a media player that incorporates send to phone functionality.

FIG. 24B shows a similar send to phone interface embedded in a media player that is displayed on a mobile device.

Figure 14:
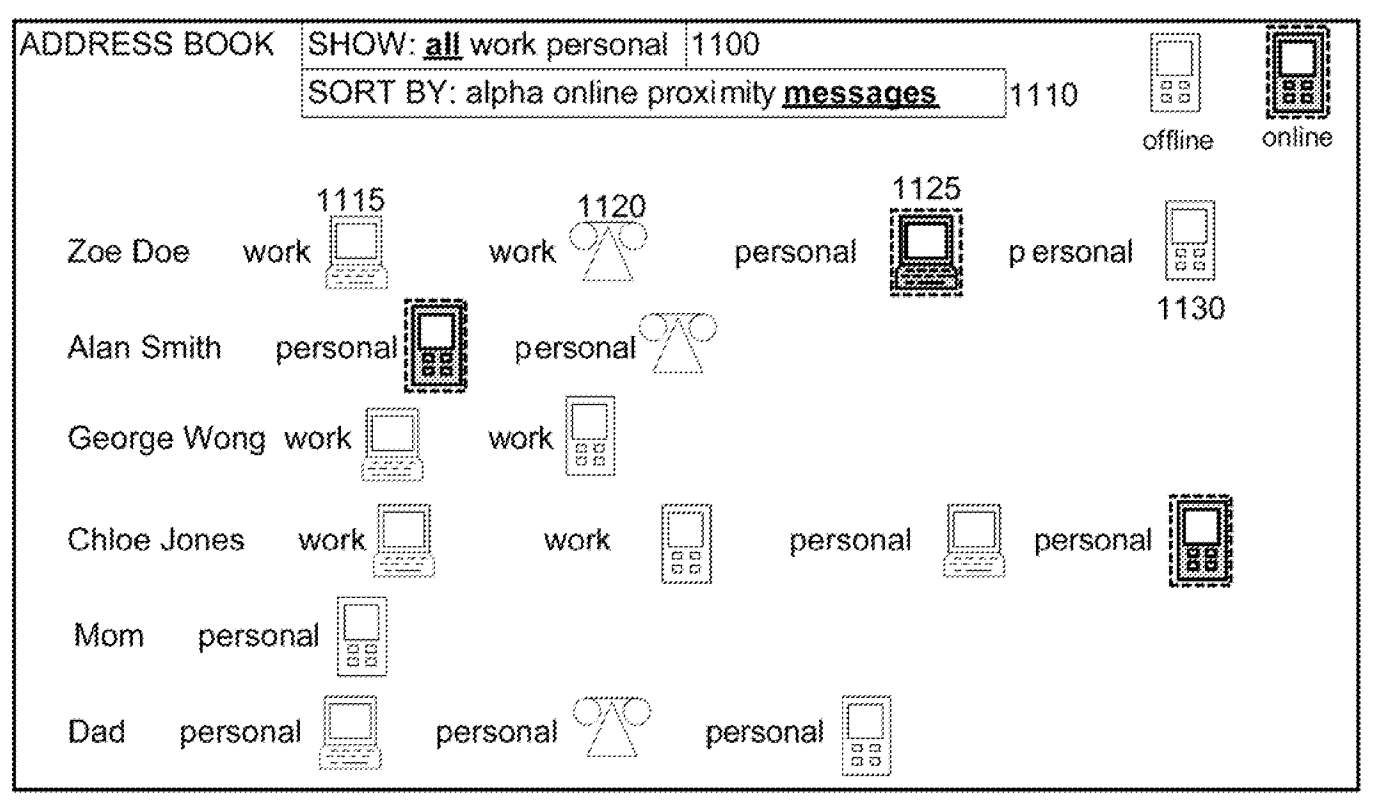

FIG. 14 is a diagram of a screen display showing which of a user's contacts are online. This display assumes MSS 70 has the user's contacts stored as part of the user's registration information, or can get access to the user's contacts stored on one or more of the devices associated with the user.

Area 1100 enables the user to filter which of their contacts are shown. In this example, the filtering can be by work or personal status.

Area 1110 enables the user the sort the display of their contacts. In this example, sorting can be done alphabetically, by online/offline status, by proximity or by how many messages the user and the contact have exchanged.

In the display of FIG. 14, each contact corresponds to one row. For example, the first contact is "Zoe Doe", and the user has associated four devices with this contact: work PC 1115, work phone 1120, personal PC 1125 and personal phone 1130. Here, each PC is accessed via an email address, and each phone is accessed via a telephone number. The icon for personal PC 1125 is highlighted, indicating that MSS 70 considers that Zoe Doe is currently online with this PC.

MSS 70 determines that a device is online when it is sending information to MSS 70, interacting at the website associated with MSS 70, or receiving information from MSS 70 in response to a request for information. In other embodiments, other techniques for determining whether a user is online may be employed.

For instance, if the display is sorted by proximity, it will display which of a user's contacts is online and closest to the user.

The display of FIG. 14 is helpful, because it enables a user to see who might quickly receive information sent to them, and can reduce the incompatibility between media and devices. For example, a high resolution high bandwidth video file would best be shared (sent) to a device with a high resolution screen, but MSS 70 enables sharing to any video-capable device.

As part of registration preferences, a user may specify which of their devices they prefer to receive notices on, and/or a priority ordering for sending notices to devices, either serially or in parallel. For instance, a user may specify that they wish to receive notices via SMS on their personal phone and via SMTP email on their personal PC, and wish to block notice traffic from their work devices unless the sender is a work contact. When a user blocks traffic from being sent to one of their devices, that device will always appear as offline in other people's contacts displays.

A user can send a file to another user having a personal computer by sending a SMTP email to the recipient including the short link for the file. This is conventional, and will not be further discussed herein.

A user can send a file to another user having a device with a phone number in various ways, depending on the characteristics of the receiving device. This process is discussed below.

Figure 15:
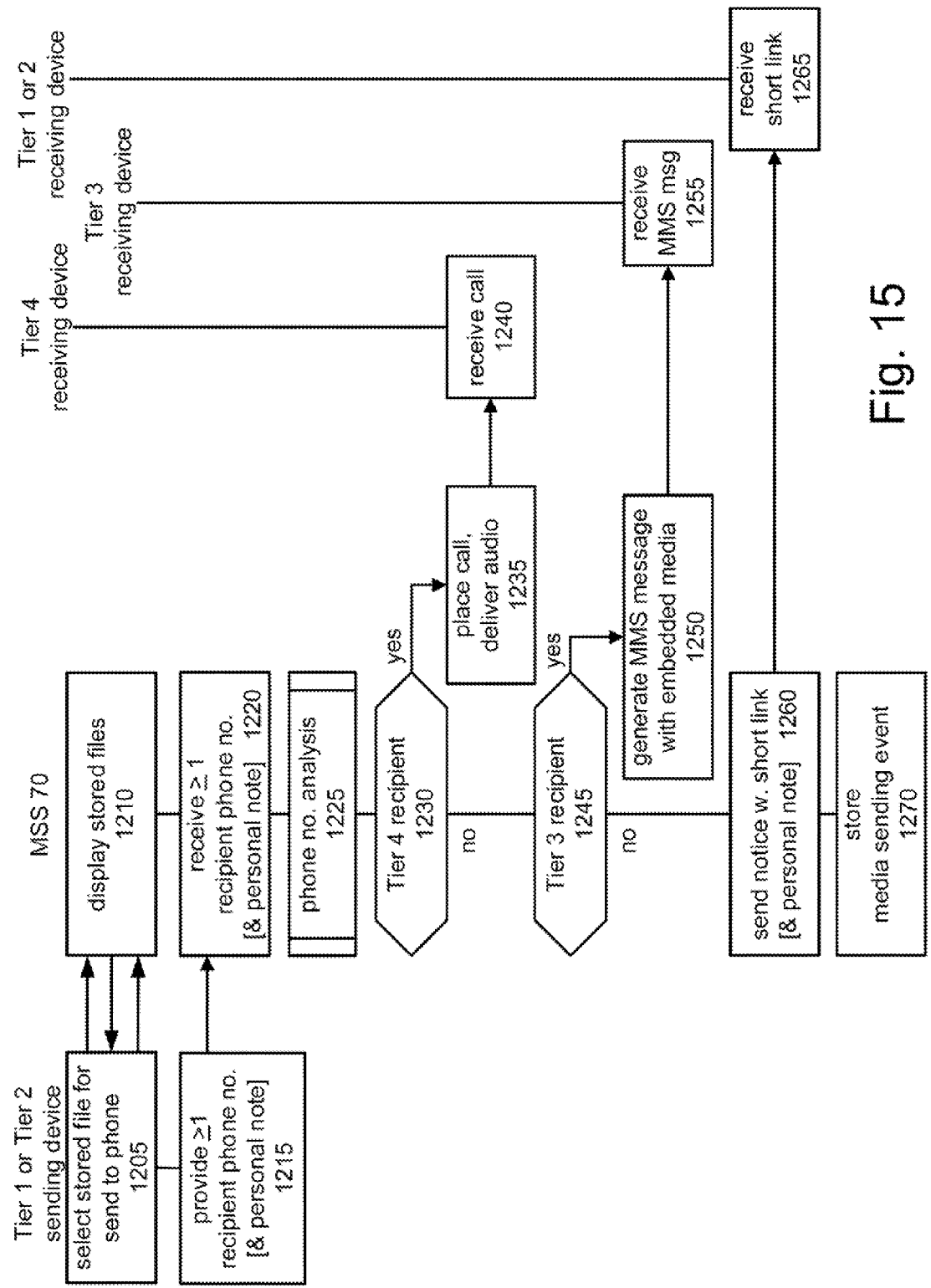
FIG. 15 is a flowchart showing a send to phone operation initiated by a sender.

FIG. 15 is a flowchart showing a send to phone operation initiated by a sender. The sender uses a Tier 1 or Tier 1 sending device. The receiving device is in any of Tiers 1-4, but processing differs depending on which tier the receiving device is in.

At step 1205, the sending device selects a stored file for send to phone, for example, by using share button 420 in FIG. 4. More particularly, the sending device goes to the website associated with MSS 70, and requests a display of stored files available for sharing via send to phone.

At step 1210, MSS 70 provides a display or list of files available for sharing, and the sending device selects which file is to be shared.

At step 1215, the sending device provides the phone number for at least one receiving device, and optionally a personal note, using an interface such as shown in FIG. 12. A phone number may be provided by direct entry, such a typing on a keypad, or by selecting from contacts associated with the user's registration information, or by uploading a phone number stored in a contacts file in the user's device, or other suitable technique.

At step 1220, MSS 70 receives the phone number for the at least one receiving device, and possibly a personal note.

Figure 16:
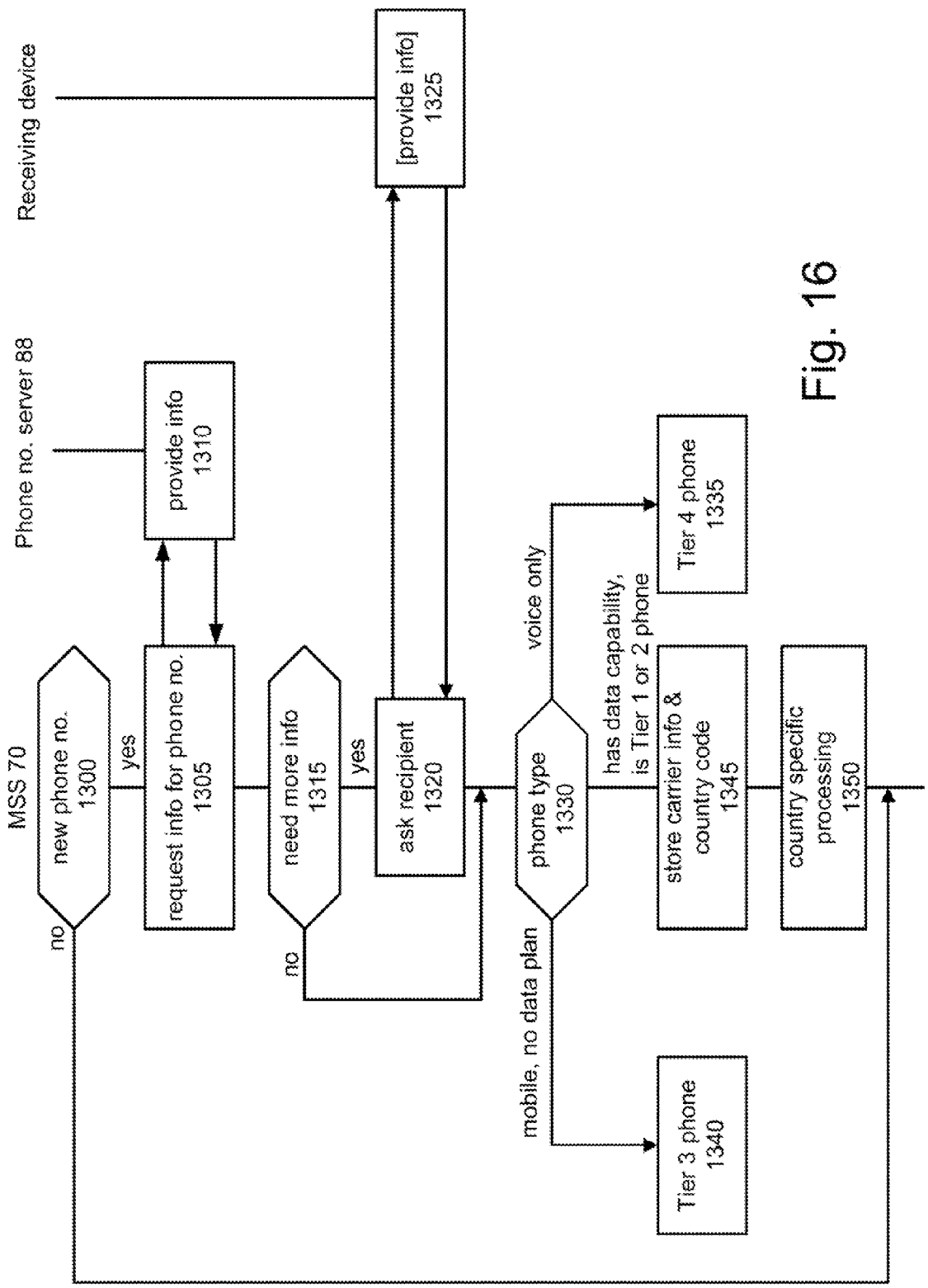
FIG. 16 is a flowchart showing, for a send to phone operation, details of phone number analysis.

At step 1225, MSS 70 obtains characteristics of the device based on phone number analysis, as shown in FIG. 16. Using the device characteristics obtained through phone number analysis, MSS 70 then determines the tier of the device and, if a new phone number, passively registers the device, an example of progressive registration.

At step 1230, MSS 70 checks if the receiving device is a Tier 4 device. If the receiving device is a Tier 4 device, at step 1235, MSS 70 automatically dials the phone number for the device to deliver an audio signal for the selected file. At step 1240, the Tier 4 receiving devices receives the call, that is, the device picks up either because a user causes the device to go to an off hook state or because the device has an automatic answering capability such as an answering machine. The Tier 4 device receives the audio signal in the voiceband, and delivery of the media is complete.

At step 1245, MSS 70 checks if the receiving device is a Tier 3 device. If the receiving device is a Tier 3 device, at step 1250, MSS 70 generates an MMS message including the optional personal note and the media as embedded content and sends it to the receiving device. The message may be sent to "phonenumber@carrier.com" where "phonenumber" was provided by the sending user and "carrier" was obtained through phone number analysis. At step 1255, the Tier 3 receiving device receives the MMS message, opens it, views the content, and delivery of the media is complete.

If the sending user is a corporate user, the sending user may specify that even if the receiving device is a Tier 1 or Tier 2 device, the media should be delivered embedded in an email or MMS message, avoiding the intermediate notice message and web experience, described below.

At step 1260, MSS 70 considers the receiving device to be a Tier 1 or Tier 2 device. MSS 70 prepares a notice message including a short link to the media, the optional personal note, and automatically generated message content. When the sending user is an individual, the automatically generated message content is generic. When the sending user is a corporation, the automatically generated message includes branding specific to the corporation and usually message content provided by the corporation. As a simple example, the automatically generated message content might be "This is a video of ABCDE sent to you by NAME" where "ABCDE" is the title of the media obtained from the metadata for the media, and "NAME" is the user's registered name. If the user is a corporation, "NAME" is the name of the corporation. If the sending user is unregistered, then a suitable phrase, such as "a friend", is substituted for "NAME".

The notice message is generally an SMS message, and in some cases, is alternatively or additionally an email message. Some versions of SMS messages cannot contain hyperlinks; these versions of SMS messages are not used when MSS 70 determines that the recipient device does not support hyperlinks. If the receiving device is outside of SMS regions, as determined from phone number analysis, then MSS 70 automatically asks the sending user to provide an email address for the recipient, instead of a phone number. For example, since Fiji is outside the SMS region of the U.S. and Canada, a sending user in the U.S. or Canada must provide an email address for a recipient in Fiji. If the notice message is a "push" notification message to software in the receiving device, these distinctions are not applicable.

At step 1265, the Tier 1 or Tier 2 receiving device receives the notice message.

At step 1270, MSS 70 stores the event of media delivery. It will be recalled that if the receiving user is only passively registered, and chooses to actively register, all of the media delivered to the user while they were passively registered becomes available as soon as they actively register.

FIG. 16 is a flowchart showing, for a send to phone operation, details of phone number analysis.

At step 1300, MSS 70 checks whether this is a new phone number by comparing the phone number with phone numbers for registered users. If the phone number is associated with a user that is either passively or actively registered, phone number analysis is unnecessary, the tier of the device is determined based on the registration information, and phone number analysis is complete.

At step 1305, MSS 70 provides the phone number to phone number server 88 and requests information about phone number characteristics. In some embodiments, multiple services are used to provide phone number information.

At step 1310, phone number server 88 receives the request from MSS 70 and provides information, such as but not limited to: whether the phone number is valid, the carrier associated with the phone number, whether it is a mobile phone number or a wireline phone number, and the country of the phone number.

At step 1315, MSS 70 determines whether it needs more information. For example, if MSS 70 has enough information to determine that the device is in Tier 3 or Tier 4, further information is not needed. As another example, MSS 70 might believe that the device is capable of receiving SMS messages, but be unsure as to whether the device can receive SMS messages due to uncertainty over whether the receiving user has purchased a data plan for the device.

At step 1320, if more information is needed, MSS 70 attempts to communicate with the user of the receiving device, such as sending an SMS message inquiring if the user has a data plan for streaming media, or prefers to receive the media as an email attachment. This is an example of progressive registration, as information is being collected only when it is needed to carry out a function. The collected information can be saved permanently or for a predetermined time, encouraging the user to actively register to avoid repeatedly answering the data plan inquiry prior to receiving media.

At step 1325, the receiving device may or may not receive the SMS inquiry, and if the inquiry is received, the user may or may not choose to respond to MSS 70. If MSS 70 can determine that the message was not deliverable, then it can conclude with reasonable assurance that the device does not have a data plan unless it finds a different explanation for the non-delivery such as carrier outage. If MSS 70 receives an explicit response from the user, then it can definitely determine the unknown information.

At step 1330, MSS 70 now determines the tier of the device.

At step 1335, if the device has voice only receiving capability, MSS 70 determines that it is a Tier 4 device.

At step 1340, if the device is a mobile phone but without a data plan, MSS 70 determines that it is a Tier 3 device. Note that for certain LG Verizon phones that do not support file downloading in their native browser, it is necessary to send an initial SMS message and then to send a second message to the MMS inbox for the device. MSS 70 maintains an internal database with such device specific information.

At step 1345, MSS 70 determines that the device is a Tier 1 or Tier 2 device, and stores the carrier information and country code associated with the phone number.

At step 1350, MSS 70 performs country specific processing, such as looking up the maximum size of an SMS message (160 characters for the U.S., 136 characters for Canada), setting the mobile keyword lexicon to the appropriate language (English for the US, or possibly French for Canada). A specific example is that French mobile keywords include "arret" for "stop", and "aide" for "help".

To recapitulate, if MSS 70 has determined that the receiving device is a Tier 3 or Tier 4 device, or the sending user is a corporate user that specifies immediate delivery of the media, then at this point, the media has been delivered to the received device. However, if the receiving device is a Tier 1 or Tier 2 device, then MSS 70 will provide a compact structured web experience to the user as a prelude to delivery of the media. More specifically, at this point, MSS 70 has sent a notice to the Tier 1 or Tier 2 device with a short link to the media.

As described below, the receiving user clicks on the short link at their convenience, and receives the compact web experience adapted to the characteristics of their device, and receives the media in a format best suited to the characteristics of their device.

FIG. 17 is a flowchart showing a send to phone operation initiated by a receiver.

At step 1400, the receiving user clicks on the short link in the notice message received from MSS 70. This action launches the web browser software in the device. Alternatively, if the notice message was a "push" notification, then when the user of the receiving device launches the application software on their mobile device, there will be an icon indicating a new notification has arrived for the user. The user clicks on the icon and is presented with a list of waiting notifications. It will be recalled that push notification is used only when the receiving device is known, at MSS 70, to have a native application. During provision of the native application from MSS 70 to the device, MSS 70 collects data commensurate with the contents of the user agent string. Accordingly, the user agent string is not required for a device executing a native application that interacts with MSS 70.

At step 1405, the web browser in the receiving device generates a user agent string that describes some of the characteristics of the device, typically, the phone model, the operating system and version executing in the device and the browser type and version executing in the device.

At step 1410, the receiving device sends the short link and the user agent string to MSS70.

At step 1420, MSS 70 receives the short link and user agent string from the receiving device.

Figure 18:
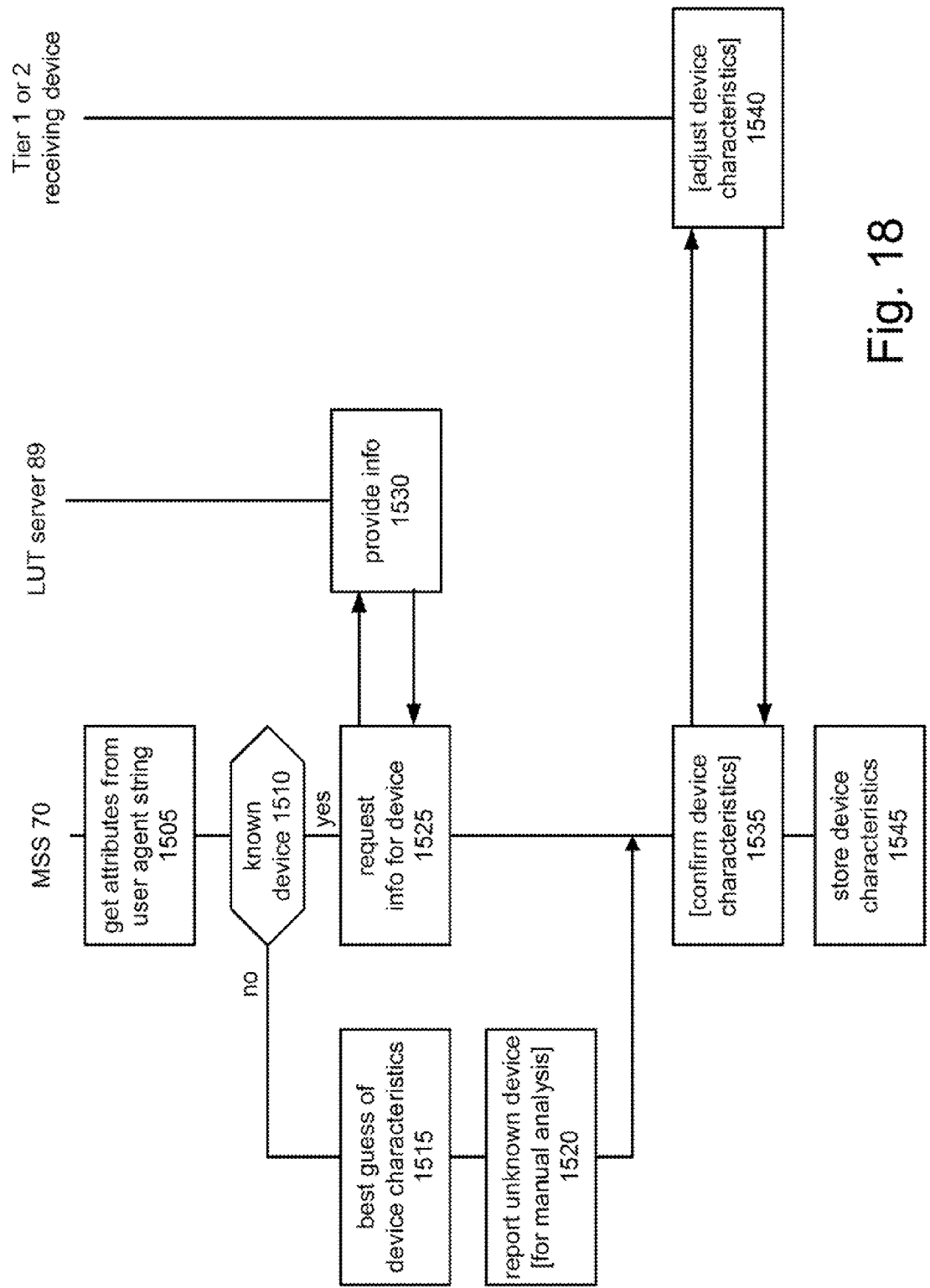
FIG. 18 is a flowchart showing, for a send to phone operation, details of device detection.

At step 1425, MSS 70 performs device detection for the receiving device, as shown in FIG. 18.

At step 1430, the user optionally provides information to MSS 70 during device detection. The information may be explicitly provided by the receiving user for this particular instance of reception, or may be passively provided as a preference in the registration information of the receiving user. When a user first explicitly provides information, MSS 70 inquires if the user wishes to save this as a default preference, an example of progressive registration.

Figure 19:
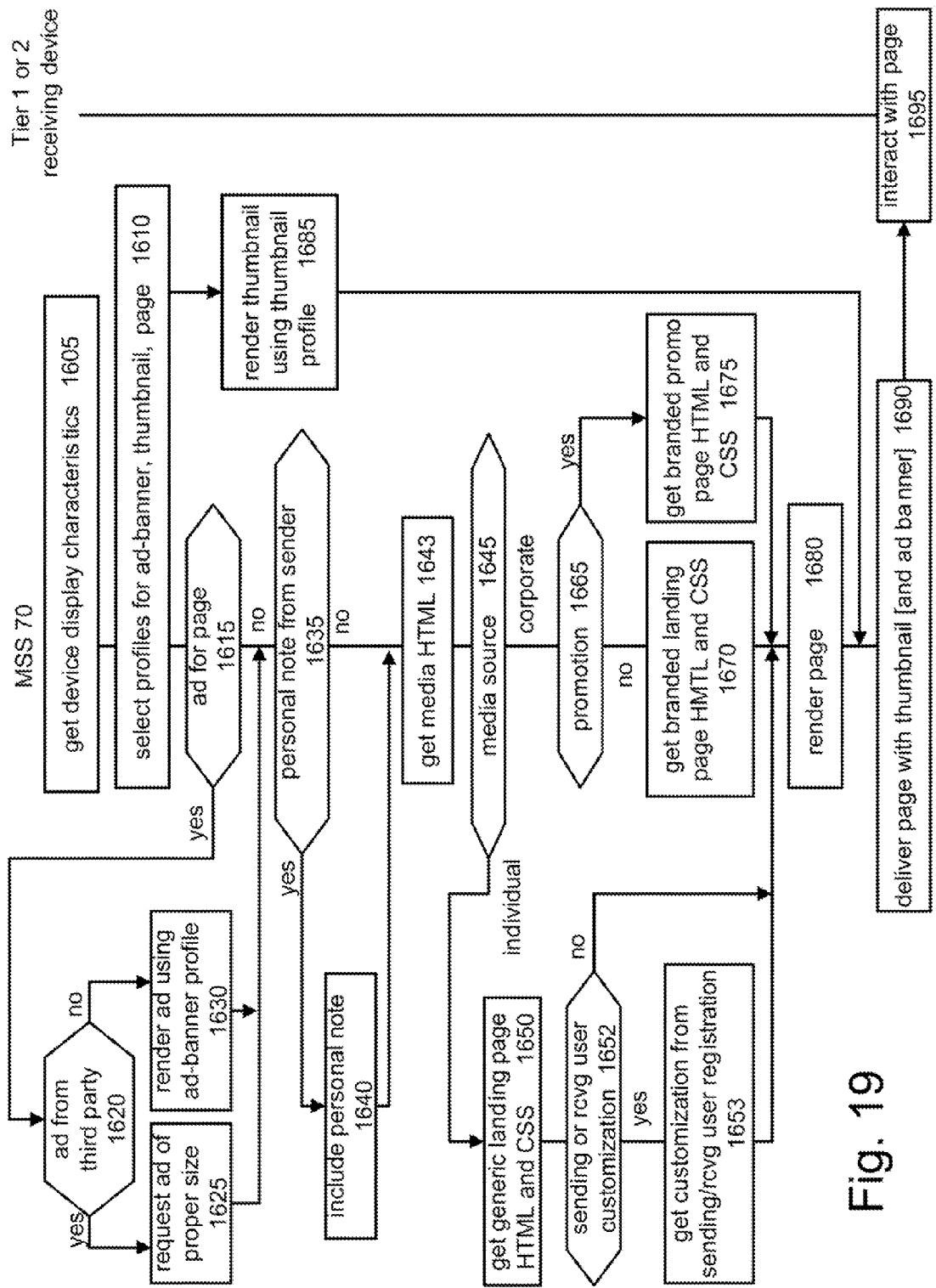
FIG. 19 is a flowchart showing, for a send to phone operation, details of adaptive rendering.

At step 1435, MSS 70 adaptively renders the web experience, as shown in FIG. 19.

At step 1440, the user optionally provides information to MSS 70 during adaptive rendering. The information may be explicitly provided or passively provided, as discussed above.

At step 1442, MSS 70 determines whether on-demand advertising should be added to the media itself, as distinguished from a banner ad discussed below. When the media is a video file, the advertisement may precede (pre-roll) or succeed (post-roll) or be inserted (mid-roll) into the video file, or be an overlay to the video where the video overlay can be a one-time limited duration overlay or a dynamic set of changing overlays. The advertising, if any, undergoes similar transcoding and delivery as the media file.

The advertising can be provided from MSS 70 and/or an ad server and/or an ad network. The ad selection can occur based on the characteristics for static advertising (see FIG. 7A step 232) and/or characteristics of the receiving device and/or the user associated with the receiving device.

Figure 22:
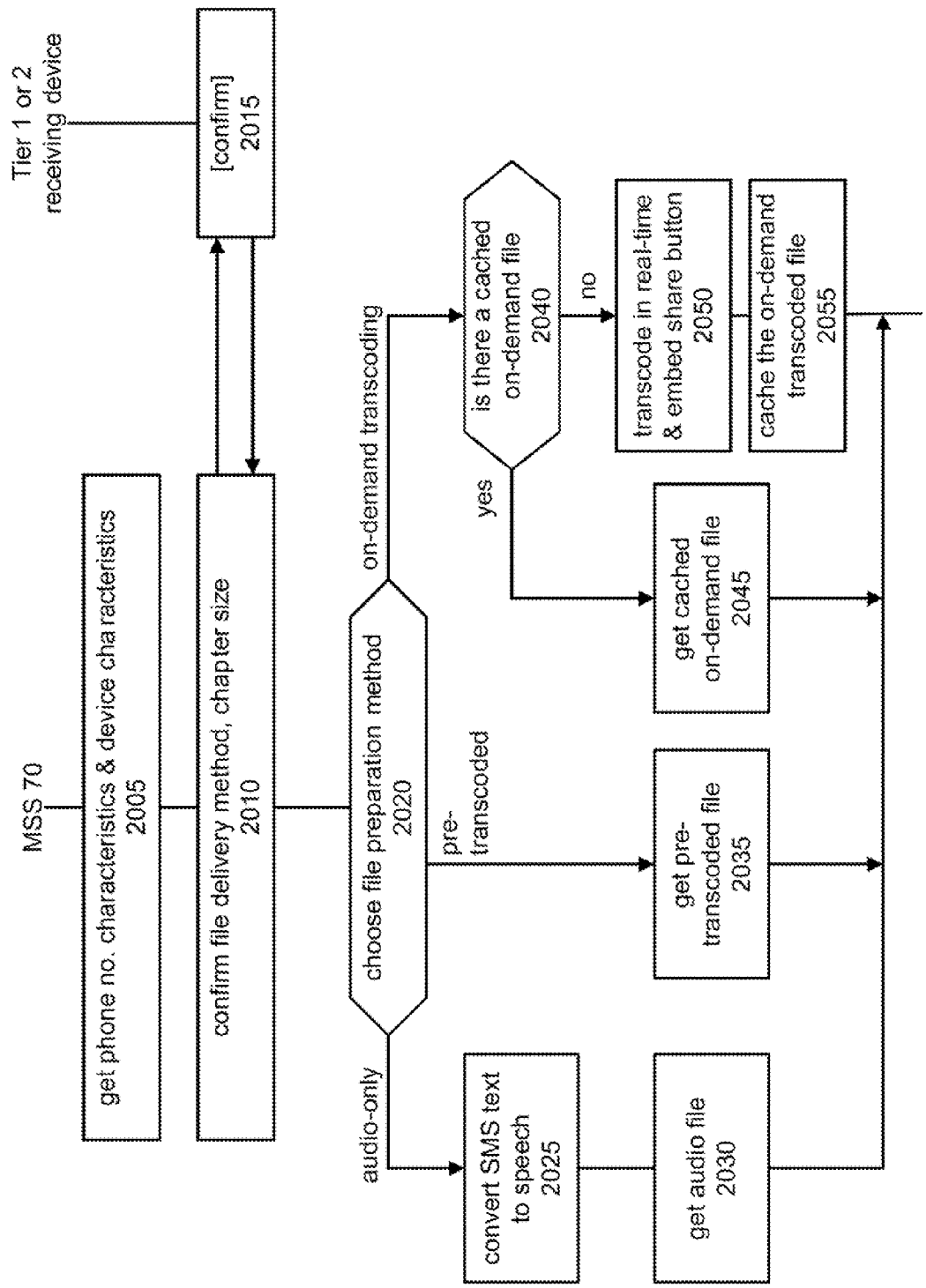
FIG. 22 is a flowchart showing, for a send to phone operation, details of transcoding processing.

At step 1445, MSS 70 performs transcoding of the media to be delivered, as shown in FIG. 22.

At step 1450, the user optionally provides information to MSS 70 during transcoding. The information may be explicitly provided or passively provided, as discussed above.

Figure 23:
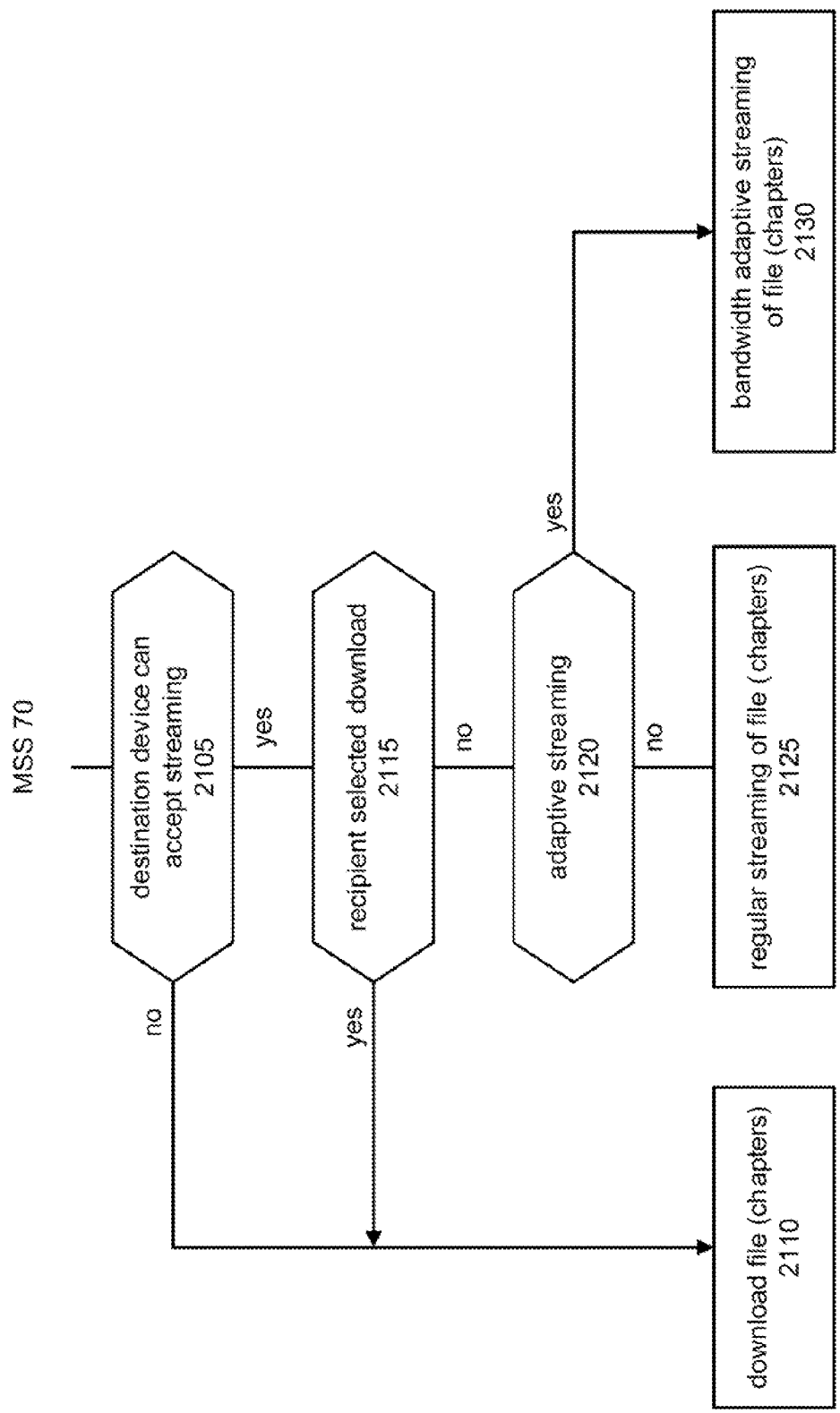
FIG. 23 is a flowchart showing, for a send to phone operation, details of delivery processing.

At step 1455, MSS 70 delivers the media, as shown in FIG. 23.

In practice, for delivery via streaming or adaptive streaming, after an initial period during which transcoding of the initial portion of a video file occurs, video transcoding occurs concurrently with delivery, so that playback can start as soon as possible. This practice is similar to progressive downloading whereby an initially downloaded portion of a video file starts playing while the remainder of the file is being downloaded.

In some embodiments, when a file is on-demand transcoded and downloaded, progressive downloading occurs.

At step 1460, the user receives the media.

At step 1465, MSS 70 stores an activity record for delivery of the media to the receiving device.

FIG. 18 is a flowchart showing, for a send to phone operation, details of device detection;

At step 1505, MSS 70 gets attributes from the user agent string of the receiving device. The attributes includes the phone model, the operating system type, the operating system version, the browser type and the browser version.

At step 1510, MSS 70 determines whether this device model is known to MSS 70. If not, processing proceeds to step 1515. If the device model is known, then processing continues at step 1525.

At step 1515, MSS 70 makes its best guess at the device characteristics, such as by finding a similar device. In one example, MSS 70 finds a known device from the same manufacturer and having the same model name but a different model version. In another example, MSS 70 finds a device having the same model name but from a different manufacturer. After finding a similar device, MSS 70 uses the operating system and browser information from the profile for the similar device as its best guess for the receiving device.

At step 1520, MSS 70 writes a report record for the unknown device, for possible manual analysis by an administrator at MSS 70. If the unknown device is popular, the administrator will manually investigate it and add to the database of known devices. If the unknown device is rare, it will be ignored by the administrator. Alternatively, a user of the device can go to a form at the website associated with MSS 70, and manually provide the characteristics of the device so that it becomes a known device; this is an example of "crowd sourcing" device database information. Processing continues at step 1535.

At step 1525, MSS 70 determines that the device is known, but its characteristics are not yet stored in MSS 70. So, MSS 70 requests information, from LUT server 89, about the device based on the information in the user agent string of the receiving device. It will be appreciated that LUT server 89 may be a plurality of servers operated by independent parties.

At step 1530, LUT server 89 receives the request, uses the information from the user agent string as an index to a look up table, and returns the looked-up information to MSS 70, which may include:

whether the receiving phone can accommodate streaming media (preferred as the delivery time appears faster to the user than for downloading), whether the receiving phone can accommodate file downloading, interaction ability of the phone, such as a touch screen for an Apple iphone, a keypad for a Motorola Razr phone, or a keyboard for a Blackberry Curve phone, a list of supported multimedia format types, such as 3gp, mov, mp4, a list of codecs incorporated in the phone, such as H.264, H.263 or MPEG-4, a list of audio codecs in the phone, such as AAC-LC, AAC-HE, AAC-NB, or AAC-WB, whether Java is available in the phone, whether JavaScript is available in the phone, whether the phone can upload via SMTP email or MMS message.

At step 1535, MSS 70 presents the user with its understanding of the characteristics of the receiving device.

At step 1540, the user of the receiving device can optionally adjust the characteristics presented thereto.

At step 1545, MSS 70 stores the device characteristics in association with the phone number of the receiving device. At this point, a new phone number has characteristics associated with it from phone number analysis, from device detection, and possibly as provided by the user of the device.

FIG. 19 is a flowchart showing, for a send to phone operation, details of adaptive rendering. A detailed use case for adaptive rendering is provided after the discussion of FIGS. 24A and 24B.

The results of phone number analysis are used with the results of device detection and optional input from the receiving user to determine the parameters for adaptive rendering of the web experience associated with media delivery. As used herein, the "web experience" comprises the display screens associated with delivery of the media to the receiving device. The first web page of the web experience is referred to as the "landing page". The landing page comprises an optional banner ad, a title, a thumbnail image of the requested media file, a text description, and buttons for at least the functions of playing the media file and sharing the media file with another user. The text description includes the personal note, if any, from the sending user and text generated by MSS 70 of the form, "This file FILE was sent to you by NAME" where "FILE" is the title of the media file from its metadata and "NAME" is the name of the sending user from his/her/its registration profile, if actively registered, or simply "a friend" if the sending user is passively registered.

Except for the thumbnail, the form and placement of parts of the landing page are represented in hypertext markup language (HTML), to be displayed on a screen, that is, rendered by a browser in the receiving device, using a style sheet.

Style sheets are well-known, and enable uniform presentation of colors, fonts, tables, buttons, background, corners, shadows, animation and so on for a web page. A variety of formats exist for style sheets depending on the capabilities and complexity of the receiving device. Using the selected page profile to select a style sheets ensures that the resulting landing page will look appropriate for the receiving device.

At step 1605, MSS 70 retrieves the stored device display characteristics associated with the receiving phone number.

At step 1610, based on the retrieved device display characteristics, MSS 70 selects an ad-banner profile from among a set of stored ad-banner profile, selects a thumbnail profile from among a set of stored thumbnail profiles, and selects a page profile from among a set of stored page profiles. The stored ad-banner, thumbnail and page profiles correspond to a variety of device configurations intended to represent the majority of Tier 1 and Tier 2 devices. A page profile specifies a combination of HTML version and style sheet version. The selection of each profile is made by comparing the receiving device characteristics with the profile characteristics and choosing the closest match. For example, there may be three or four ad-banner profiles corresponding to three or four different sized ad banners; there may be three page profiles Page profile 1: HTML 4 and CSS 1,
Page profile 2: HTML 5 and CSS 2,
Page profile 3: HTML 5 and CSS 3;

and there may be six or seven different thumbnail profiles corresponding to different receiving device screen resolutions.

At step 1615, MSS 70 determines whether a banner advertisement is to be displayed as part of the page. If so, processing continues at step 1620. If not, processing continues at step 1635

At step 1620, MSS 70 determines whether the banner ad is from a third party ad server or third party ad network or is stored at MSS 70.

An ad server may be a distinct physical entity, such as ad server 84, or may be operative as a component of MSS 70, or of B2B2C server 80 or media server 82. An ad network is a distinct physical entity such as ad server 84. Generally, when an ad server or ad network supports ad sizing for mobile devices, MSS 70 sends a request for an ad to the ad server or ad network, the request including sizing information for the receiving device, and the ad is delivered from the ad server or the ad network directly to the receiving device. When the ad server or ad network does not support ad sizing for mobile devices, then the ad is delivered from the ad server or ad network to MSS 70 for sizing in accordance with display capabilities of the receiving device.

Assuming the banner is from a third party ad server or ad network that supports ad sizing for mobile devices, at step 1625, MSS 70 sends a request to ad server 84 to send an ad of the proper size to the receiving device.

If the ad is stored at MSS 70, or is sent to MSS 70 from an ad server or ad network that does not support ad sizing for mobile devices, at step 1630, MSS 70 retrieves the ad and renders the ad using the selected ad-banner profile from step 1610.

At step 1635, MSS 70 checks whether there is a personal note from the sender. If there is a personal note from the sender, at step 1640, MSS 70 includes the personal note in the landing page it is generating. It will be recalled that the personal note was also included in the notice message to the receiving device sent at step 1260 of FIG. 16.

At step 1643, MSS 70 checks the media file for any HTML. For example, if the file is part of a playlist, the HTML may define "forward" and "back" buttons for navigating within the playlist.

At step 1645, MSS 70 checks whether the source of the media is an individual user or a corporate user. Note that the source of the media is not necessarily the same as the party sending the media to the receiving user. The source of the media is the party that uploaded the media to MSS 70, which MSS 70 determines from the meta-data associated with the stored media. If the source is an individual, processing continues at step 1650. If the source is a corporation, processing continues at step 1665.

At step 1650, MSS 70 retrieves the HTML and the style sheet for a generic landing page. As used herein, generic means non-branded, or branded with a logo from MSS 70.

At step 1652, MSS 70 checks the sending user registration information and the receiving user registration information to see if there is any HTML and/or style sheet customization. If not, processing continues at step 1680.

At step 1653, MSS 70 obtains the HTML and/or style sheet customization from the registration information of the sending and/or receiving user. An example of HTML customization is a face picture of the sending user to be included in the receiving user's landing page. An example of style sheet customization is specification of a particular background for the receiving user's web experience, such as hot pink and bright red zebra stripes. Processing continues at step 1680.

At step 1665, MSS 70 determines whether the corporate use is running a promotion.

If the corporate user is not running a promotion, at step 1670, MSS 70 gets the HTML and style sheet for a branded landing page for the corporate user.

An example of branded HTML is that the play button has a different name such as "stream now". Another example of branded HTML is a button to be placed on the landing page named "store locator" that links to a webpage of authorized sellers. Another example of branded HTML is a "buy now" button that links to a mobile commerce application of the corporate user.

An example of branded CSS is a background showing the logo of the corporate user repeated according to a color scheme chosen by the corporate user.

If the corporate user is running a promotion, at step 1675, MSS 70 gets the HTML and style sheet for the promotional page provided by the corporate user. Generally, the promotional descriptive material provides for additional web pages as part of the web experience, prior to the landing page, to describe the promotion to the user and/or enable the user to participate in the promotion.

A promotion may include a coupon with a bar code that can be presented for redemption via the receiving device, such as a restaurant coupon presented on the receiving device prior to ordering from the restaurant menu. A promotion may be restricted to devices in particular geographic areas. A promotion may be offered to selected users, such as an individual user that has subscribed to a file or channel of the corporate user.

At step 1680, MSS 70 renders the page content using the selected page profile HTML and selected style sheet, optionally modified as described above. The result is a landing page that is adapted to the capabilities and configuration of the receiving device.

At step 1685, MSS 70 renders the thumbnail associated with the stored media using the selected thumbnail profile.

At step 1690, MSS 70 delivers the rendered landing page including the relevant content and the rendered thumbnail to the receiving device.

At step 1695, the receiving device interacts with the rendered page.

Figure 20A:
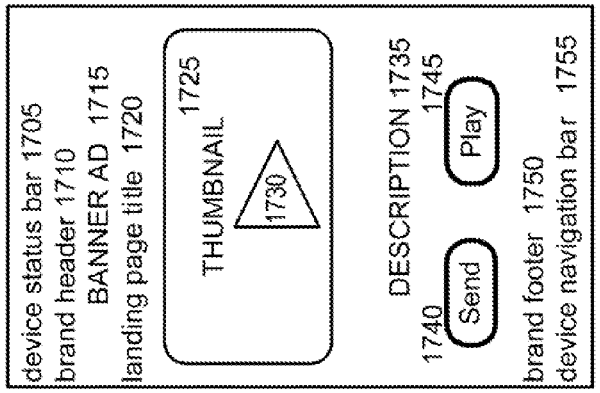
FIGS. 20A and 20B are diagrams showing a screen display on different mobile devices.
Figure 20B:
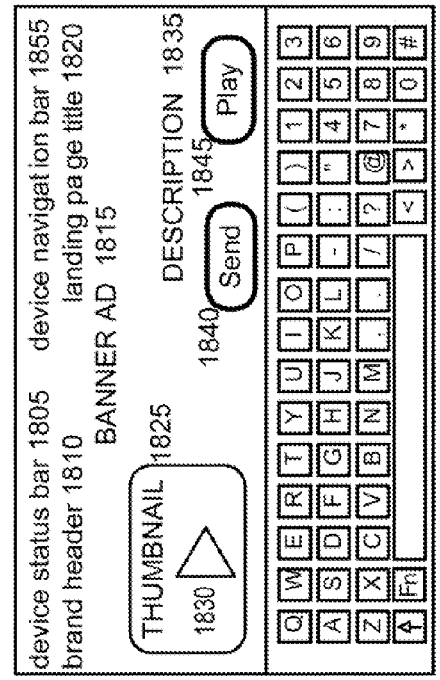

FIGS. 20A and 20B are diagrams showing a screen display of a landing page on different mobile devices. It will be appreciated that the size of elements of the landing page and their positioning on the page are adapted to the capabilities of the device. For example, the display in FIG. 20A has a big thumbnail image in the center of the screen, while the display in FIG. 20B has a smaller thumbnail on the left side of the screen. The thumbnail content is the same for both screens. As another example, since the screen in FIG. 20A is big, there is room for brand footer 1750, whereas due to the smaller size of the screen in FIG. 20B, a brand footer is not included in the page. Content for a brand footer element might be a slogan, a customer service phone number, a small graphic image, or simply a color band with no text.

Figure 21:
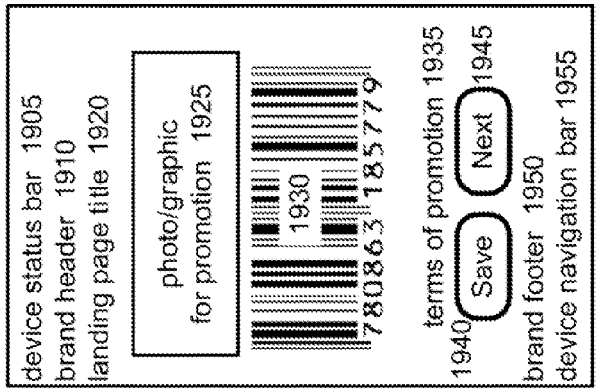
FIG. 21 is a diagram showing a screen display on a mobile device.

FIG. 21 is a diagram showing a screen display of a promotional page on a mobile device. The promotion-specific elements of the promotion page are area 1925 for displaying a photographic or graphic image relating to the promotion, area 1930 for displaying a bar code relating to the promotion, and area 1935 providing text with the terms of the promotion. For example, the promotion might be for a receiving device that is near a particular restaurant, there is a coupon for a discount on an appetizer. The position of a receiving device may be determined from the phone number associated with the receiving device or from any other suitable geographically aware processing technique. In some cases, during device detection, shown in FIG. 18, MSS 70 asks the user for permission to access their location to provide a suitable promotion. After the user is finished with the promotion, the user navigates to the landing page (see FIGS. 20A and 20B) using next button 1945.

FIG. 22 is a flowchart showing, for a send to phone operation, details of transcoding processing. FIG. 22 is described with respect to a file, but it will be understood that a playlist is treated similarly.

At step 2005, MSS 70 retrieves the characteristics associated with the phone number from phone number analysis and device detection.

At step 2010, MSS 70 selects delivery parameters based on the retrieved characteristics, and sends a message to the receiving device confirming the file delivery method (download, streaming or adaptive streaming), and the chapter size, if any. In some cases, other information may be provided for confirmation such as the file type (audio only, high resolution video, standard resolution video, low resolution video).

At step 2015, the receiving device receives the confirmation message, and optionally replies to alter the information presented for confirmation. For example, the user may believe herself to be in an area with poor cellphone reception, and prefer download instead of streaming.

At step 2020, MSS 70 chooses the file preparation method based on the user's adjustments, if any, to the presented information. If the file preparation method is audio-only, processing continues at step 2025. If the file preparation method is pre-transcoding, processing continues at step 2035. If the file preparation method is on-demand transcoding, processing continues at step 2040.

An example of an audio-only file is AMR-NB or AMR-WB, to be delivered as voiceband audio via telephone network 20. An example of a pre-transcoded file is an MPEG-4 video file for a receiving device having an H.264 video codec and an AAC-HE audio codec, to be delivered via data network 10. An example of an on-demand transcoded file is a 3GP file delivered, according to the IETF RTSP communication standard, via data network 10. See the discussion for selecting a GCD file at FIG. 8B step 730.

At step 2025, for audio-only delivery, MSS 70 converts the text in the landing page, or promotional page, to speech using text-to-speech synthesis. For example, the text may be "This file is FILENAME sent to you by a friend" where "FILENAME" is the title of the media file in the metadata for the media file.

At step 2030, MSS 70 retrieves a pre-transcoded audio file for the selected media, stored at one of steps 649 and 699 of FIG. 8A, and the transcoding process is complete.

At step 2035, MSS 70 retrieves a pre-transcoded file for the selected media, stored at one of steps 629, 639, 669, 679, 689 of FIG. 8A for a video file, optionally adds background filler, referred to as "letterboxing", so that the dimensions of the displayed media will properly correspond to the media player window of the receiving device, and the transcoding process is complete. It will be appreciated that pre-transcoding enables step 2035 to be fast.

If the media file is a graphic file, and the media width is greater than the media height, MSS 70 maps the graphic file to the device's window width, and adds filler at the top and/or bottom of the image. See FIG. 8B.

If the media height is greater than the media width, MSS 70 maps the graphic file to the device's window height, and adds filler at the left and/or right sides of the image.

The transcoding process is complete.

At step 2040, MSS 70 checks whether it has a cached version of the on-demand transcoded file.

If there is a cached version, at step 2045, MSS 70 retrieves the cached version.

If there is not a cached version, at step 2050, MSS 70 transcodes the file in real-time to the selected format. It will be appreciated that on-demand transcoding may introduce a user-perceivable processing delay in providing the media, relative to pre-transcoded formats, in which case pre-transcoding is preferred. However, if the receiving device is best suited to use of a file format that is transcoded on-demand, then the delay introduced by on-demand transcoding is deemed worthwhile, because the on-demand transcoded file will look better on the receiving device.

In one embodiment, the on-demand transcoding starts with the source format of the originally uploaded file; this usually results in better quality output because there is only one translation of the file from its source format. In another embodiment, on-demand transcoding always starts with the highest quality pre-transcoded format; this means when a new file format is added, MSS 70 needs only include a software module for translating from pre-transcoded format to the new file format, rather than from all of the possible source formats to the new file format, but the resulting file is typically of lower quality as it has been translated twice, once to the pre-transcoded format and a second time to the new file format.

At step 2055, MSS 70 caches the on-demand transcoded file, in case this receiving device, or a similar receiving device, requests the file again in the near future.

The transcoding process is complete.

FIG. 23 is a flowchart showing, for a send to phone operation, details of delivery processing.

At step 2105, based on the characteristics associated with the phone number, MSS 70 checks whether the destination device can accept streaming. Streaming is preferred to downloading due to improved apparent response time. If not, processing continues at step 2110. If the device can accept streaming, processing continues at step 2115.

At step 2110, MSS 70 downloads the media file to the receiving device.

At step 2115, MSS 70 checks whether the user has selected downloading (see FIG. 22 step 2010); if so, processing continues at step 2110. A user device may support both streaming and downloading. If the user is in an area with a constrained wireless signal and/or a signal with high latency, then downloading could be preferable to streaming.

As used herein, "latency" refers to the minimum time needed to send information from MSS 70 to the receiving device. Latency depends on things like line speed and the receive and retransmit delay in routers and modems. A low latency indicates a high network efficiency At step 2120, MSS 70 checks whether the receiving device is capable of adaptive streaming. If not, processing continues at step 2125. If so, processing continues at step 2130.

Bandwidth adaptive streaming serves to smooth latency variability. For bandwidth adaptive streaming, MSS 70 may select the bandwidth for streaming based on the network access bandwidth of the receiving device, e.g., EDGE, 3G or WiFi, and/or the real-time status of the network access of the receiving device, e.g., a device on a train going from an EDGE network area to a 3G network area.

In one embodiment, the decision regarding bandwidth adaptive streaming depends only on the type of the receiving device.

In another embodiment, the decision regarding bandwidth adaptive streaming depends on how busy the carrier network is, which is determined by MSS 70 sending a ping to the receiving phone and getting a reply to the ping that reports timing and latency along the route.

In a further embodiment, the decision regarding bandwidth adaptive streaming depends upon the location of the receiving device. The location of the receiving device is determined automatically from a geographically aware device, that is, a device with GPS or similar location sensing equipment, that responds to a query from MSS 70; or is determined by MSS 70 asking the user. MSS 70 combines the location of the receiving devices with information from an external sources that measures carrier delay and data rate variability in that area.

At step 2125, MSS 70 sends the file to the device using regular streaming.

At step 2130, MSS 70 sends the file to the device using bandwidth adaptive streaming.

FIGS. 24A and 24B are diagrams showing different screen displays on a mobile device.

FIG. 24A shows the media player window for the media file with minimal framing information provided by the software in the receiving device.

FIG. 24B shows the media player window for the media file with some page rendering information provided by MSS 70: brand header 2315, banner ad 2320 and brand footer 2340. Additionally, the media player incorporates send to phone capability, shown in element 2335.

A use case for adaptive rendering will now be described.

Let it be assumed that John Doe, an individual user, is sending a video to another individual user, Jane Smith. Both John Doe and Jane Smith are registered users of MSS 70. More specifically, Doe uploaded a video of his birthday cake to his account, and at the website for MSS 70, used the send to phone capability, entering Smith's phone number as the recipient for his new birthday cake video. MSS 70 detects that Smith is a registered user, and has a Tier 1 device, an Apple iPhone 3GS. So, MSS 70 sends an SMS message to Smith's iPhone with a short link to Doe's video. Smith clicks on the short link, and MSS 70 processing has proceeded to FIG. 19. At this point, the contents of user registration database 74B are shown in Table 1, the contents of device profiles database 74C are shown in Table 2, the contents of media and metadata database 74D are shown in Table 3, the contents of ad database 74E are shown in Table 4 and the contents of web experience database 74F are shown in Table 5.

TABLE 1

Registration database 74B

Registration START ---
Name: John Doe
User Device: Blackberry Bold
Phone Number: 555-444-3210
Email: johndoe@othersite.com
User Type: Individual
Source of ads: TripleClick
Landing Page Color: body{ background-color: #000000;}
Profile Picture: johnDoe.jpg
--- Registration END TABLE 1-continued Registration database 74B Registration START ---
Name: Jane Smith
User Device: iPhone 3GS
Phone Number: 555-555-1212
Email: janesmith@anothersite.com
User Type: Individual
Landing Page Color: body{ background-color: #FFFFFF;}
Profile Picture: JaneSmith.jpg
--- Registration END

TABLE 2

Device profiles database 74C

Profile START ---
Model: iPhone 3GS
Vendor: Apple
Width: 320
Height: 480
Usable Width: 320
Usable Height: 420
Year Released: 2008
Touchscreen_ Yes
JavaScript Support: Yes
Streaming Media: No
Downloading Media: Yes
Media Types: Mov, MP4, 3GP
Video Codecs Supported: H.264, H.263, and MPEG-4
Audio Codecs Supported: AAC-LC, AAC-HE, AAC-NB, and AAC-WB
Java support: No
SMTP Upload Support:Yes
MMS Message Support: Yes
--- Profile END
ad_banner_prof_1: 300 width × 75 height
ad_banner_prof_2: 216 width × 54 height
ad_banner_prof_3: 168 width × 42 height
thumb_prof_1: 100 width × 100 height
thumb_prof_2: 80 width × 80 height
thumb_prof_3: 70 width × 70 height
thumb_prof_4: 50 width × 50 height
thumb_prof_5: 40 width × 40 height
page_prof_1: HMTL4 & no CSS
page_prof_2: HMTL4 & CSS 1
page_prof_3: HMTL4 & CSS 2
page_prof_4: HTML 5 & CSS 2
page_prof_5: HTML 5 & CSS 3

TABLE 3

Media and metadata database 74D

File START ---
Filename: birthdaycake.mp4
Uploader source: John Doe
File Title: My Birthday Cake
Latitude: 40.760399
Longitude: −73.981247
Resolution: 480 width × 360 height
Codec: MPEG-4
Duration: 45 seconds
Banner Ads: Yes
Thumbnail Source: thumbnail_birthdayCake.jpg
Thumbnail Source Resolution: 480×360
--- File END

TABLE 4

Ad database 74E

Name: TripleClick, Type: Ad Server, Mobile Media Sizing:Yes
Name: ACME Ads, Type: Ad Server, Mobile Media Sizing:Yes

TABLE 4-continued

Ad database 74E

Name: Joe's Ad Network, Type: Ad Network, Mobile Media Sizing:Yes
Name: AdPlus, Type: Ad Network, Mobile Media Sizing: No
Name: ExpertAds, Type: Ad Network, Mobile Media Sizing: No

TABLE 5

Web experience database 74F

Title HTML - <title>%FileTitle</title>
Thumbnail HTML- <img id="imgVideoThumbnail" class="thumbnail " border="0" src=%ThumbnailSource>
Thumbnail CSS - .thumbnail {display:block; }
Description HTML - <div id="description"> This is a file of %FileTitle sent to you by %Name</div>
Description CSS - .description{margin-right:auto; margin top:6px; padding:8px; width:84%;}
PlayButton HTML - <div class="play"><a href="video/MP4AAC.9913.mp4" Play</a></div>
PlayButton CSS - .play{color:black;display:block;border:1px solid;}
ShareButton HTML - <a href="ShareWithOthers.aspx?videoid=q35wt26c"><img src="images/share.jpg"><span class="share">Share</span></a>
ShareButton CSS - .share{color:black;display:block;border:1px solid;}
Coupon HTML<div id="coupon"><img style="border-width: 0px;" src="coupon/newCD.jpg width="300" height="55"></div>
Coupon CSS - .coupon{background-color:#ffffff; display:block;}
Landing Page Color: body{ background-color: #F88017;}
Landing page = title HTML, thumbnail HTML, thumbnail CSS, description HTML, description CSS, play button HTML, play button CSS, share button HTML, share button CSS
Promotion Page background color: #F88017
Promotion page = title HTML, title CSS, description HTML, description CSS, coupon HTML, coupon CSS At step 1605, MSS 70 retrieves from device profiles database 74C (see Table 2) the stored device display characteristics associated with the receiving device, namely Smith's iPhone. The retrieved information is shown in Table 6.

TABLE 6

Width: 320
Height: 480
Usable Width: 320
Usable Height: 420
Touchscreen_ Yes
JavaScript Support: Yes
Media Types: Mov, MP4, 3GP
Video Codecs Supported: H.264, H.263, and MPEG-4
Audio Codecs Supported: AAC-LC, AAC-HE, AAC-NB, and AAC-WB
Java support: No At step 1610, based on the retrieved device display characteristics of the iPhone 3GS, MSS 70 selects from device profiles database 74C (see Table 2) an ad-banner profile from among a set of stored ad-banner profiles, and selects a thumbnail profile from among a set of stored thumbnails. Specifically, since the iPhone's display is 320 width×480 height, thumb_prof_1 and ad_banner_prof_1 are selected as they are best matched to the iPhone's display resolution. Because the iPhone's browser supports multiple levels of HTML and CSS, the highest quality page profile, page_profile_5, is selected as that produces HTML 5 and CSS 3 resulting in the richest experience.

At step 1615, MSS 70 determines a banner advertisement is to be displayed as part of the page, by looking at the metadata for the content file (Banner Ads: Yes).

At step 1620, MSS 70 checks the sending user profile to determine that the ad source is a third party ad server, TripleClick, an instance of ad server 84. MSS 70 also determines that the third party ad server is capable of mobile media sizing by looking at the descriptive information in ad database 74E (see Table 4).

At step 1625, MSS 70 sends an http request to TripleClick to send an ad to the receiving device 555-555-1212 having a size of 300×75 determined by ad_banner_prof_1.

At step 1635, MSS 70 checks whether there is a personal note from the sender. There is no personal note in this example.

At step 1643, MSS 70 checks the media file for any HTML. There is no associated HTML, as this file is standalone and not part of a playlist.

At step 1645, MSS 70 checks the source of the media from the meta-data associated with the media file. Based on the meta-data element UploaderSource, MSS 70 determines that the source is John Doe, then MSS 70 consults registration database 74B to determine the user type of John Doe, specifically "individual".

At step 1650, MSS 70 retrieves the HTML and the style sheet from web experience database 74F for the web page in accordance with the selected page profile. Since this is not a corporate source, MSS 70 retrieves information for a generic landing page. First, MSS 70 retrieves the HTML that defines a landing page (see Table 5):

Landing page=title HTML, thumbnail HTML, thumbnail CSS, description
   HTML, description CSS, play button HTML, play button CSS, share button
   HTML, share button CSS then, MSS 70 retrieves the HTML components listed in the HTML defining the landing page (omitted here for brevity).

At step 1652, MSS 70 checks the sending user registration information to see if HTML and/or style sheet customization has been determined. In this case there is user information specifying customization.

At step 1653, MSS 70 obtains the HTML and style sheet customization, first the default information from web experience database 74F, then the customization from the sending user, then the customization from the receiving user. The last obtained information overwrites earlier obtained information. Web Experience database 74F defines the Custom Landing Page Color as # F88017 (orange). John Doe's profile in registration database 74B defines the Custom Landing Page Color as #000000 (black). Jane Smith's profile in registration database 74B defines the Custom Landing Page Color as

FFFFFF (white). Therefore, MSS 70 decides to include #FFFFFF white for the landing page color sent to Jane at 555-555-1212. The other defined elements are as defined in 74F for the generic (non-branded) landing page.

At step 1680, MSS 70 renders the page content using the selected page profile HTML and selected style sheet, optionally modified as described above by the user in step 1652. For brevity, only selected examples of the rendering are discussed.

A first example is the generic description HTML, converted from

Description HTML—<div id="description"> This is a file of % FileTitle sent to you by % Name</div> to

Description HTML—<div id="description"> This is a file of my birthday cake sent to you by John Doe.</div>

A second example is the share button, converted from

ShareButton HTML—<a href="ShareWithOthers.aspx?videoid=q35wt26c"><img src="images/share.jpg"><span class="share">Share</span></a> and

ShareButton CSS—.share{color:black;display:block;border:1px solid;} to

ShareButton HTML—<a href="ShareWithOthers.aspx?videoid=q35 wt26c"><img src="images/share.jpg"><span class="share">Share</span></a> and

ShareButton CSS—.share{position: absolute; top: 200px; right: 150px;font-size:15px;font-weight:bold;margin: 3px auto;min-width: 100px;padding:5px 2px;text-align:center;text-decoration:none;text-shadow:−1px 1px 0 rgba(255, 255, 255, 0.6);white-space:nowrap; width:27%;text-align:center;]

The share button has been placed 200 pixels from the top and 150 pixels from the right, due to the device profile Usable Width of 320 pixels and Usable Height of 420 pixels. It is also rendered with a curved border due to the level of CSS support.

A third example is the background color, converted from

Landing Page Color: body{background-color: #F88017;} to

Landing Page Color: body{background-color: #FFFFFF;}

The background color of the page has been rendered white.

The result is a landing page that is adapted to the capabilities and configuration of the receiving device.

At step 1685, MSS 70 renders the thumbnail associated with the stored media using the selected thumbnail profile. The stored thumbnail has a resolution of 320×240, the thumbnail profile specifies 100×100, so the thumbnail rending converts the thumbnail to the proper size of 100×100. If there were multiple stored thumbnail images, it is likely that the desired size would be one of the stored sizes, so instead of a thumbnail rendering operation, a faster thumbnail retrieval operation would occur.

At step 1690, MSS 70 delivers the rendered landing page including the relevant content and the rendered thumbnail to the receiving device. The ad-banner is delivered by TripleClick to the receiving device.

At step 1695, the receiving device receives the ad-banner and rendered page and its web browser combines these into a page that is presented to the user.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of sending a media file to a destination device, the media file including at least one of video content, audio content, photographic content and graphic content, comprising:

receiving, at a computer at a central facility, a content identifier for the media file and a phone number for the destination device;

checking, by the computer at the central facility, whether the phone number is associated with a registered user;

when the phone number is associated with a registered user,
(1) determining the capability of the destination device based on registration information associated with the register user, and
(2) delivering, from the computer at the central facility to the destination device, the media file in accordance with the determined capability; and when the phone number is not associated with a registered user,
(i) sending, by the computer at the central facility, a request to a phone number server, the request including a phone number of the destination device,
(ii) receiving, at the computer at the central facility from the phone number server, characteristics associated with the phone number, and
(iii) determining, in accordance with the received characteristics of the phone number, that the destination device has one of voiceband-only capability, limited data messaging capability and full data messaging capability; and
(iv) delivering the media file in accordance with the capability of the destination device by:
(a) when the destination device has voiceband-only capability, using a one-step delivery technique comprising:
converting, by the computer at the central facility, the media file to an audible signal comprehensible by a human,
calling, by the computer at the central facility, the phone number for the destination device, and
delivering, from the computer at the central facility to the destination device, the audible signal during the call;
(b) when the destination device has limited data messaging capability, using a one-step delivery technique comprising:
embedding, by the computer at the central facility, the media file in a data message to generate an embedded data message, and
sending the embedded data message from the computer at the central facility to the phone number for the destination device; and
(c) when the destination device has full data messaging capability, using a two-step delivery technique comprising:
a first step including:
(i) generating, by the computer at the central facility, a notice message including a link to the media file identified by the content identifier, and
(ii) sending the notice message from the computer at the central facility to the phone number for the destination device, and a second step including:
- (iii) receiving, at the computer at the central facility, the link to the media file and a device model from the destination device,
- (iv) determining, by the computer at the central facility, characteristics of the destination device based on the device model,
- (v) selecting, by the computer at the central facility, a content provision technique for the media file associated with the link based on the characteristics of the destination device, the content provision technique selected from the set comprising downloading and streaming, and
- (vi) sending, from the computer at the central facility to the destination device, the media file according to the selected content provision technique.

2. A method of sending a media file to a destination device, the media file including at least one of video content, audio content, photographic content and graphic content, comprising:
- receiving, at a computer at a central facility, a content identifier for the media file and a phone number for the destination device;
- checking, by the computer at the central facility, whether the phone number is associated with a registered user;
- when the phone number is associated with a registered user,
  - (1) determining the capability of the destination device based on registration information associated with the register user, and
  - (2) delivering, from the computer at the central facility to the destination device, the media file in accordance with the determined capability; and
- when the phone number is not associated with a registered user,
  - (i) sending, by the computer at the central facility, a request to a phone number server, the request including a phone number of the destination device,
  - (ii) receiving, at the computer at the central facility from the phone number server, characteristics associated with the phone number, and
  - (iii) determining, in accordance with the received characteristics of the phone number, that the destination device has one of limited data messaging capability and full data messaging capability; and
  - (iv) delivering the media file in accordance with the capability of the destination device by:
    - (a) when the destination device has limited data messaging capability, using a one-step delivery technique comprising:
      - embedding, by the computer at the central facility, the media file in a data message to generate an embedded data message, and
      - sending the embedded data message from the computer at the central facility to the phone number for the destination device; and
    - (b) when the destination device has full data messaging capability, using a two-step delivery technique comprising:
      - a first step including:
        - (i) generating, by the computer at the central facility, a notice message including a link to the media file identified by the content identifier, and
        - (ii) sending the notice message from the computer at the central facility to the phone number for the destination device; and
      - a second step including:
        - (iii) receiving, at the computer at the central facility, the link to the media file and a device model from the destination device,
        - (iv) determining, by the computer at the central facility, characteristics of the destination device based on the device model,
        - (v) selecting, by the computer at the central facility, a content provision technique for the media file associated with the link based on the characteristics of the destination device, the content provision technique selected from the set comprising downloading and streaming, and
        - (vi) sending, from the computer at the central facility to the destination device, the media file according to the selected content provision technique.

3. The method of claim 2 wherein the phone number for the destination device is received from a send-to-phone instruction.

4. The method of claim 2 wherein the phone number for the destination device is received from a subscription request.

5. The method of claim 2 wherein analyzing the phone number includes
- sending, by the computer at the central facility, a request to a phone number server, the request including a phone number of the destination device;
- receiving, at the computer at the central facility from the phone number server, characteristics associated with the phone number; and
- determining that the destination device is one of a mobile device with limited data messaging capability, and a mobile device with full data messaging capability, in accordance with the received characteristics of the phone number.

6. The method of claim 5, wherein the characteristics associated with the phone number include at least one of (i) whether the phone number is valid, (ii) a carrier associated with the phone number, (iii) which of a mobile and a wireline service is associated with the phone number, and (iv) a country of the phone number.

7. The method of claim 2, wherein determining characteristics of the destination device based on the device model includes
- providing, by the computer at the central facility, the device model to a look-up table server, and
- receiving, at the computer at the central facility, the characteristics from the look-up table server.

8. The method of claim 7, wherein the characteristics include at least one of (i) whether the device model supports streaming video, (ii) whether the device models supports file downloading, (iii) interaction ability of the phone model with regard to touch screen, keypad and keyboard, (iv) supported multimedia format types, (v) video codecs in the device model, (vi) audio codecs in the device model, (vii) whether the device model can execute downloaded software, (viii) whether the device model supports Javascript, (ix) whether the device model supports email, and (x) whether the device model supports multi-media messaging.

9. The method of claim 2, further comprising
- receiving, by the computer at the central facility, the media file from a source, and
- storing, at the central facility, the media file,
- wherein the receiving is in response to one of:
  - (i) an email attachment,
  - (ii) uploading from a website,
  - (iii) uploading from a source device,
  - (iv) a multi-media message with embedded content, (v) an audio signal generated in real-time, and
(vi) bulk uploading.

10. The method of claim 9, further comprising
transcoding, by the computer at the central facility, the received media file to generate a set of pre-transcoded media files,
storing, at the central facility, the set of pre-transcoded media files, and
wherein the sending of the media file according to the selected content provision technique sends one of the pre-transcoded media files.

11. The method of claim 2, further comprising
transcoding, by the computer at the central facility, the media file based on the characteristics of the destination device to generate an on-demand transcoded media file, and
wherein the sending of the media file according to the selected content provision technique sends the on-demand transcoded media file.

12. The method of claim 2, further comprising
preparing, by the computer at the central facility, a web page based on the characteristics of the destination device and a source of the media file, and
wherein the sending of the media file according to the selected content provision technique also sends the web page.

13. The method of claim 2, wherein the selecting of a content provision technique for the media file associated with the link based on the characteristics of the destination device includes
when the destination device cannot accept streaming, selecting downloading;
when the destination device has a preference for downloading, selecting downloading;
when the destination device does not support adaptive streaming, choosing non-adaptive streaming, and
when the destination device supports adaptive streaming, choosing adaptive streaming.

14. The method of claim 2, further comprising adding an ad to the media file, and wherein the sending of the media file according to the selected content provision technique also sends the ad.

15. The method of claim 2 wherein the content identifier and the phone number for the destination device are included in a send-to-phone message.

16. The method of claim 15, wherein the send-to-phone message originates from one of (i) a website provided by the computer at the central facility, (ii) a third party website, and (iii) a mobile device.

* * * * *